Dec. 20, 1938.　　　　E. E. HEWITT　　　　2,140,624
SPEED CONTROLLED BRAKE
Filed June 30, 1936　　　2 Sheets-Sheet 1
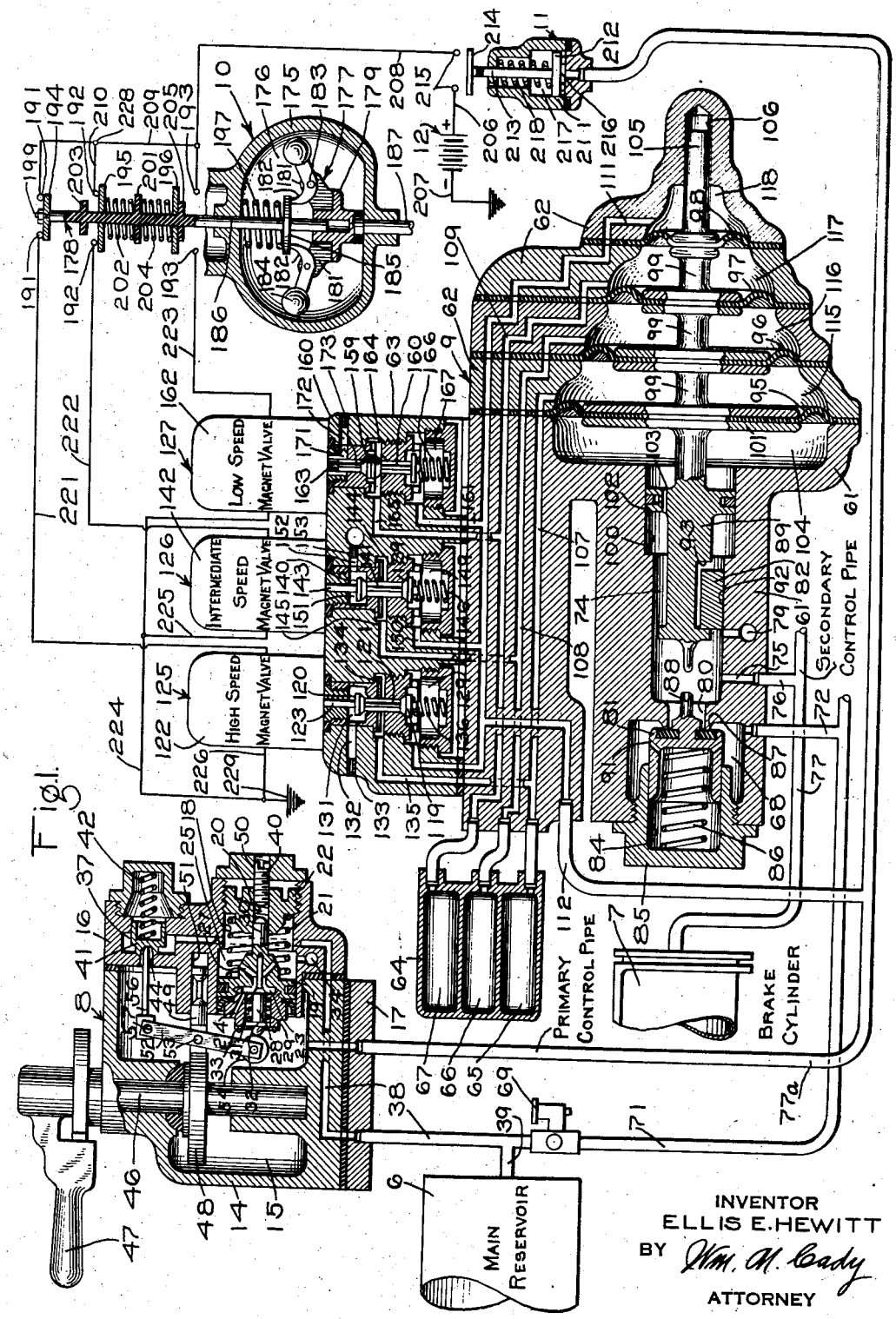
INVENTOR
ELLIS E. HEWITT
BY Wm. M. Cady
ATTORNEY Dec. 20, 1938.　　　　　E. E. HEWITT　　　　　2,140,624
SPEED CONTROLLED BRAKE
Filed June 30, 1936　　　　2 Sheets-Sheet 2
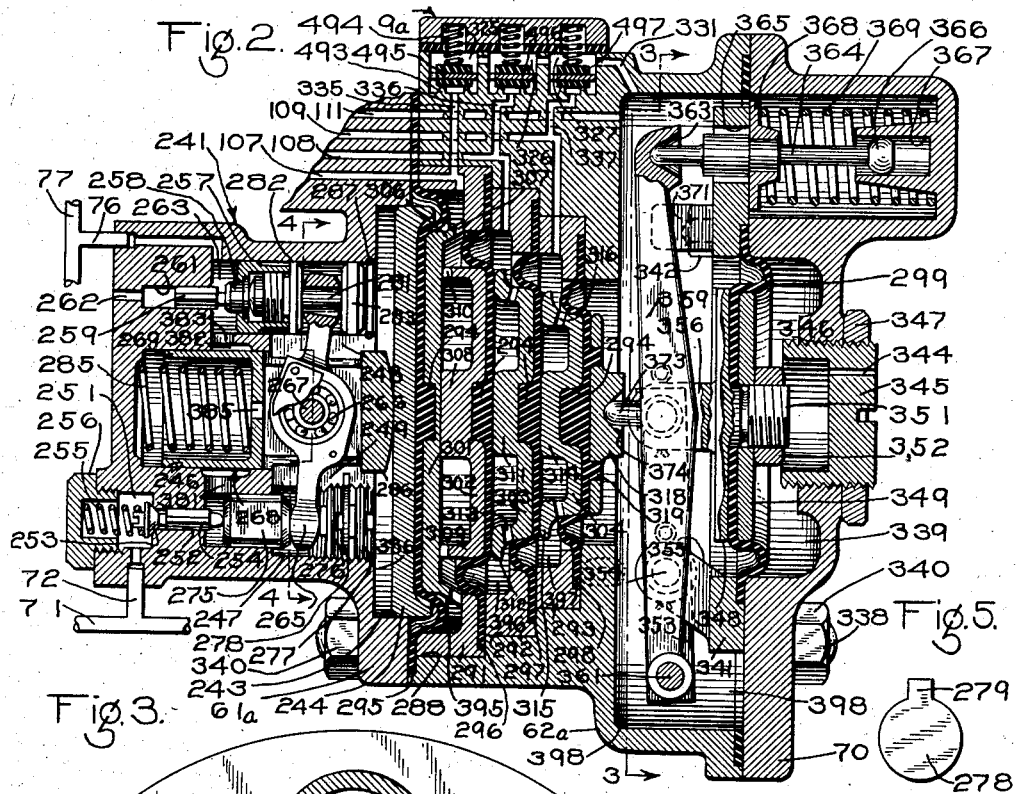
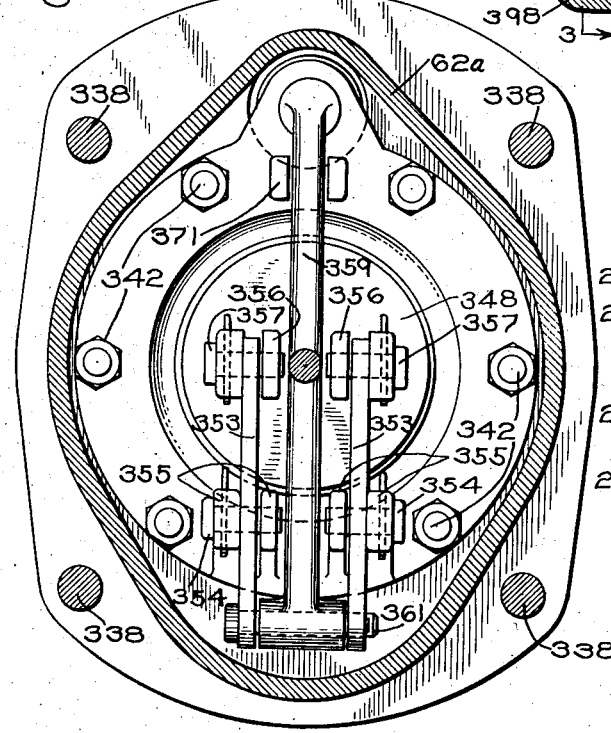
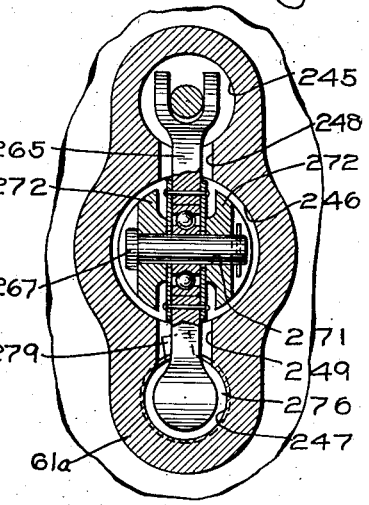
INVENTOR
ELLIS E. HEWITT
BY
ATTORNEY Patented Dec. 20, 1938

2,140,624

UNITED STATES PATENT OFFICE 2,140,624

SPEED CONTROLLED BRAKE

Ellis E. Hewitt, Edgewood, Pa., assignor to The Westinghouse Air Brake Company, Wilmerding, Pa., a corporation of Pennsylvania Application June 30, 1936, Serial No. 88,098

42 Claims. (Cl. 303—21)

This invention relates to brake equipments or systems for vehicles, such as high speed railway cars or trains, which equipments or systems are adapted to automatically control the brake cylinder pressure, the braking force and the braking ratio according to the speed of the car or train.

As is well known, the coefficient of friction between the brake shoes and the car wheels becomes greater for the lower speeds of travel and, conversely, that the coefficient of friction between the brake shoes and the car wheels becomes lower for the higher speeds of travel. In order, therefore, to prevent the application of the brake shoes to the car wheels with such excessive force at the lower speeds of travel that sliding of the wheels would be caused due to the exceeding of the coefficient of adhesion between the car wheels and the track rails, various devices and systems have been devised for automatically reducing the brake cylinder pressure and consequently the braking force so as to prevent sliding of the wheels. Among the various types of such devices or systems are those including an inertia operated device or retardation controller which is automatically effective according to the rate of retardation of a car or train to cause such reduction in the brake cylinder pressure while the car or train is decelerating under the application of the brakes that the rate of retardation of the car or train is regulated to a substantially uniform rate.

In my copending application Serial No. 741,063, filed August 23, 1934, and assigned to the assignee of the present application, there is shown and described a combination straight air and automatic brake system employing an inertia operated device or retardation controller for controlling the brake cylinder pressure so as to prevent sliding of the wheels.

In embodying my invention in practical form, it is my intention to provide a brake system of either the straight-air or automatic type or a system having both straight-air and automatic operation, as in systems of the character shown and described in the copending application referred to, the retardation controller of the said copending application being replaced however by a relay or control valve device of novel construction which is controlled automatically according to the speed of the car or train to cause variations of the brake cylinder pressure in a series of steps as the speed of the car or train reduces in being brought to a stop. Thus in my present invention, the brake cylinder pressure or braking force is decreased automatically from the higher pressures or forces effective at the higher speeds to lower pressures or forces at the lower speeds in order to prevent sliding of the car wheels at the lower speeds.

In the copending application, Serial No. 40,902, filed September 17, 1935, of which I am joint applicant with Clyde C. Farmer and in the copending application Serial No. 66,234, filed January 28, 1936, of John W. Logan, Jr., both of which applications are assigned to the assignee of the present application, there are disclosed various types of brake systems wherein speed responsive devices are employed to effect reduction in brake cylinder pressure automatically upon a reduction in the speed of travel of the car or train. However, in both of the applications just mentioned, only one automatic reduction in brake cylinder pressure from the highest initial brake cylinder pressure is effected during an application of the brakes and this one reduction occurs only when the speed of the car or train reduces below a relatively low uniform speed, such as fifteen or twenty miles per hour. In my present invention, I propose to provide brake equipments including novel control valve devices operative according to the speed of travel of the car or train to automatically effect a graduated reduction, that is, reduction in a series of steps, of brake cylinder pressure from the highest pressure in the brake cylinder at the time an application of the brakes is initiated without necessitating any manual operation by an operator. Furthermore the novel control devices, which I provide, so regulate the rate of change of brake cylinder pressure in passing from one pressure step to a lower pressure step that the change in brake cylinder pressure does not take place abruptly but rather in a gradual manner so as to prevent shocks and jars to the car and the consequent discomfort to the passengers.

In general, therefore, it is an object of my present invention to provide a brake equipment for high speed cars or trains, which equipment is of the character shown and described in the copending application Serial No. 741,063, above referred to, wherein the automatic control of the brake cylinder pressure or braking force to prevent sliding of the wheels is effected according to the speed of the car or train.

It is another object of my invention to provide a brake system of the character indicated in the foregoing object and including novel control devices and arrangements for automatically causing different brake cylinder pressures, that is braking ratios, to be effective at the time an application of the brakes is initiated, dependent upon the speed of the car or train at the time the application of the brakes is initiated.

Another object of my invention is to provide a brake system of the character indicated in the foregoing object wherein the novel control devices and arrangements for determining the brake cylinder pressure or braking ratio at the time an application of the brakes is initiated also operates automatically to reduce the brake cylinder pressure or braking ratio in a series of steps as the speed of the car or train reduces under the application of the brakes.

Another object of my invention is to provide, in a brake system of the character indicated in the foregoing objects, a novel control valve device, which is controlled automatically according to the speed of travel of the car or train, to effect reduction in a secondary control pipe pressure, which controls brake cylinder pressure, to pressures having uniform and successively decreasing ratios with a given fixed primary control pipe pressure, as the speed of the car reduces under the application of the brakes.

A further object of my invention is to provide a control valve device of the character indicated in the foregoing object which is adapted upon applications of the brakes at below a certain low speed of travel of the car to cause the pressure in the secondary control pipe and accordingly in the brake cylinder to be built up substantially equally with the pressure in the primary control pipe until such time as the brake shoes contact the car wheels, and thereafter to cause the secondary control pipe pressure to bear less than a one to one ratio to the primary control pipe pressure.

Another object of my invention is to provide a control valve device of the character indicated in the foregoing objects, which enables rapid adjustment of the secondary control pipe pressure in correspondence to a reduction in the primary control pipe pressure.

The above objects, and other objects of my invention which will be made apparent subsequently, are attained by means of several simplified illustrative embodiments described hereinafter and shown in the accompanying drawings wherein, Fig. 1 is a simplified view of the essential elements of a brake system embodying my invention, showing one type of novel control device, Fig. 2 is a fragmentary sectional view showing a modified type of control device, Fig. 3 is a sectional view taken on the line 3—3 of Fig. 2, Fig. 4 is a sectional view taken on the line 4—4 of Fig. 2, and Fig. 5 a view showing the lock washer of Fig. 4 in detail.

Referring to Fig. 1, the brake equipment shown is for one car and is illustrative of similar equipment on other cars in a train. The equipment for one car may comprise a main reservoir 6, a brake cylinder 7, a self-lapping brake control valve device 8 of usual construction, a novel control valve device 9 constituting part of my invention and adapted for controlling brake cylinder pressure according to the speed of travel of the car or train, a speed responsive or governor switch device 10 for controlling the magnet valve devices of the control valve device 9, a pneumatic switch device 11, and a source of electrical energy indicated as a storage battery 12.

Considering the various parts of the equipment now in further detail, the self-lapping brake control valve device 8 comprises a casing section 14 having formed therein a suitable pressure chamber 15 open at one end, a casing section 16 secured to the casing section 14 to close the open end of the chamber 15 and a pipe bracket section 17 secured to the section 14.

The section 16 contains a bore 18 having a piston 19 therein, the piston being yieldingly urged toward the chamber 15 in the section 14 by a biasing spring 21 interposed in the bore 18 between one face of the piston 19 and an adjusting screw 22 threaded into the outer end of the bore 18. The piston 19 is provided with a chamber 23 which is open to the chamber 15 through a passage 24 in the piston and which is also open to a chamber 25 at the opposite side of the piston to the chamber 15 through a bore 26 and a pair of branch passages 27. Contained in the chamber 23 is a release valve 28 shown as a pin valve which is normally unseated from its associated valve seat surrounding the bore 26 by a coil spring 29, the spring 29 being interposed in a bore 31 in the face of the piston 19 which is open to the chamber 15 between the wall of the piston and a flange or collar 32 on the valve 28. A washer or collar 33 is removably secured to the face of the piston and is provided with a central opening through which the end of the valve extends, the washer 33 serving as a stop to be engaged by the flange 32 on the valve 28 to limit the unseating movement of the valve 28 from its valve seat. The chamber 25 at the right of the piston 19 is constantly open to atmosphere through an exhaust port and passage 34.

The casing section 16 is also provided with a chamber 37 which is constantly connected to the main reservoir 6 through a passage and pipe 38 and a branch pipe 39, the chamber 37 containing a supply valve 41 which is yieldingly urged by a spring 42, interposed between the valve and the inner face of a cap screw threaded into the casing section, into seated relation on an associated valve seat to close a supply port 44 in the wall of the casing section 16 connecting the chambers 15 and 37.

Operation of the supply valve 41 and the release valve 28 is effected by means of a rotary operating shaft or stem 46 suitably mounted in the casing section 14 and having at the exterior end thereof an operating handle 47 secured thereto in the usual manner and an operating cam 48 secured to the shaft 46 within the chamber 15. The face of the cam 48 engages the end of a plunger 49 slidably mounted in a bore 51 in the inner face of the casing section 16 and opening into the chamber 15, the plunger 49 carrying a floating lever 52 which is pivotally secured intermediate the ends thereof by a pin 53 extending through the plunger 49. Suitably mounted at one end of the lever 52 is a roller 54 which is adapted to engage the end of the release valve 28 projecting into the chamber 15, the opposite end of the lever 52 having one end a stem or rod 56 pivotally secured thereto as by a pin 57, the opposite end of the stem extending through the port 44 and engaging a suitable recess at the inner seated area of the supply valve 41.

The adjusting screw 22 is provided with a central bore 20 for slidably receiving at the inner end thereof the stem 30 of the piston 19. The outer end of the bore 20 is threaded to receive a screw 40, and a lock nut 50 is provided for locking the screw 40 in place.

The biasing spring 29 of the release valve 28 is relatively lightly tensioned while the biasing spring 42 for the supply valve 41 is more strongly tensioned. This biasing spring 21 for the piston 19 is more strongly tensioned than the spring 42 and the tension thereof may be adjusted as desired by turning the adjusting screw 22. The purpose of the varying spring tensions and strengths will appear presently.

When the operating handle 47 of the control valve device 8 is rotated from release position into the application zone, the cam 48 on the shaft 46 causes movement of the plunger 49 inwardly of the bore 51. Since the spring 42 is stronger than the spring 29, inward movement of the plunger 49, as just described, causes pivotal movement of the lever 52 on the pin 57 as a fulcrum, the end of the lever 52 carrying the roller 54 being thus moved in a counterclockwise direction to seat the release valve 28 on its associated valve seat to close the communication between the chamber 15 and the atmospheric exhaust passage 34. When the release valve 28 is seated, the biasing spring 21 acting on the piston 19 prevents further movement of the end of the lever 52 carrying the roller 54 and consequently the lever 52 is thereafter pivotally moved in a clockwise direction, with the axis of the roller 54 as a fulcrum, to thereby cause movement of the operating stem 56 in the right-hand direction to overcome the biasing spring 42 and unseat the supply valve 41. Fluid under pressure is thus supplied from the main reservoir and the supply chamber 37 through the port 44 to the pressure chamber 15.

When the pressure in the chamber 15 increases sufficiently to move the piston 19 against the force of the biasing spring 21, the biasing spring 42 for the supply valve 41 becomes effective to reseat supply valve 41 and cut off further supply of fluid under pressure to the chamber 15.

If the operating handle 47 is rotated to a further extent away from release position into the application zone, cam 48 causes further inward movement of the plunger 49, the supply valve 41 being thereby again unseated to again supply fluid under pressure from the main reservoir 6 and supply chamber 37 to the chamber 15 until such time as the pressure in the chamber 15 is sufficient to move the piston 19 in the right-hand direction against the force of the spring 21 and thus permit reseating of the supply valve 41.

The maximum pressure attainable in the chamber 15 is determined by the adjustment of the screw 40 which limits the movement of the piston 19 in the right-hand direction, for obviously if the piston 19 is prevented from moving in the right-hand direction in response to the pressure in the chamber 15 acting thereon, the supply valve 41 cannot be reseated and consequently the full pressure of the main reservoir becomes effective in the chamber 15.

When the operating handle 47 is returned toward release position from application position, the force on the lever 52 holding the release valve 28 seated is relieved and the spring 29 thus becomes effective to unseat the release valve to open communication for the exhaust of fluid under pressure from the chamber 15 through the passage 24, chamber 23, port 26, passages 27, chamber 25 and exhaust passage 34. When the pressure of the fluid in the chamber 15 is reduced sufficiently, the biasing spring 21 acting on the piston 19 moves the piston in the left-hand direction and since the roller 54 carried on the lever 52 is held in position by the hand of the operator which holds the operating handle in position and thereby prevents inward movement of the valve 28, the piston 19 carrying the valve seat for the valve 28 is moved into engagement with the valve 28 to close the exhaust communication for the chamber 15 to prevent further reduction in the pressure of the fluid therein. When the operating handle 47 is returned a further degree toward release position, the release valve 28 is again unseated to cause fluid under pressure to be exhausted from chamber 15 through the exhaust passage 34 until such time as the spring 21 becomes effective to again reseat the valve 28 to close off the exhaust communication.

When the handle 47 is returned into release position, the spring 21 is ineffective to cause reseating of the valve 28, and the valve 28 accordingly remains unseated as shown in Fig. 1 to cause the complete venting of fluid under pressure from the chamber 15 to atmosphere through the exhaust port 34.

It will thus be observed that the pressure in the chamber 15 is at all times proportional to the position of the operating handle 47 in the application zone with respect to the release position.

The control valve device 9 which constitutes a particular feature of my invention, may comprise a casing having a relay valve section 61, a plurality of diaphragm clamping sections 62, and a magnet valve section 63. Associated with the casing of the control valve device 9 is a casing 64 in which are formed a plurality of timing reservoirs 65, 66 and 67, the casing 64 being optionally formed as a separate unit, as shown, or integrally secured to and forming a part of the casing of the control device 9.

The casing section 61 of the control valve device 9 has formed therein a chamber 68 which is constantly supplied with fluid under pressure from the main reservoir 6 at a pressure regulated by a feed valve device 69 of well known construction through a pipe 71, hereinafter designated the feed valve pipe, and branch pipe 72. Also formed in the casing 61 and connected to the chamber 68 through a port or passage 80 is a chamber 74 having a port 75 opening thereoutof to which is connected, through a branch pipe 76, a pipe 77, hereinafter designated the secondary control pipe. The secondary control pipe 77 is, for the purpose of simplification, shown as leading directly to the brake cylinder 7. It will be understood, however, that in practice I intend that suitable control equipment, such as shown in my copending application Serial No. 741,063 referred to above and intervening in the control pipe between the retardation controller shown therein and the brake cylinder, also intervene, in the present instance, in the secondary control pipe 77 between the control valve device 9 and the brake cylinder 7.

For the purpose of controlling communication between the chamber 68 and the chamber 74 through port 80 and for controlling communication between the chamber 74 and an atmospheric exhaust port or passage 79, a supply valve 81 and a release valve 82 are respectively provided. The supply valve 81 may be in the form of a piston valve slidably mounted in the bore 84 in a cap screw 85 which closes the chamber 68, a biasing or return spring 86 being interposed between the cap screw 85 and the rear face of the valve 81 to yieldingly urge it into seated engagement on an annular rib seat 87 surrounding the passage 80 connecting the chambers 68 and 74. The valve 81 is provided with a projecting stem 88 which extends through the passage 80 into the chamber 74 and which is adapted to be engaged by the end of a valve operating stem 89 in the manner which will appear presently. One or more ports 91 are provided in the valve 81 in order to prevent dash-pot action of the valve 81 in the bore 84 of the cap screw 85 and for equalizing the fluid pressure on opposite sides of the valve.

The release slide valve 82 slides on a suitable seat face 92 and is loosely engaged in a suitable recess 93 in the valve operating stem 89.

When the valve operating stem 89 is moved in the left-hand direction, the release slide valve 82 is first moved to close communication between the chamber 74 and the atmospheric exhaust port 79 and then the left-hand end of the operating stem 89 engages the projecting stem 88 on the supply valve 81 and unseats the valve 81 against the force of the spring 86 to open communication for the supply of fluid under pressure from the feed valve pipe 71 and the chamber 68 to the chamber 74 and the secondary control pipe 77. When the operating stem 89 is moved in the right-hand direction, the operating stem 89 first disengages the stem 88 of the supply valve 81 so that it is reseated by the spring 86 to cut off communication between the chambers 68 and 74 and then it moves the release slide valve 82 to uncover the exhaust port 79 and thereby establish communication through which fluid under pressure may be vented from the secondary control pipe 77 and the chamber 74 to atmosphere.

Movement of the valve operating stem 89 is effected by variations in the pressure of fluid acting on a series of connected movable abutments or diaphragms 95, 96, 97 and 98, of successively decreasing pressure areas in the order named.

The diaphragms 95, 96, 97 and 98 are suitably mounted in spaced coaxial relation by means of the clamping sections 62 and in such relation to the casing section 61 that the common axis thereof is coincident with the axis of the operating stem 89. A plurality of spacing members 99 of spool shape and varying size are disposed, one between each pair of successive diaphragms, and cooperate to secure the diaphragms together for simultaneous movement, the right-hand end of the operating stem 89 having a flange 101 which cooperates with one of the flanges on one of the spacing members 99 to secure the diaphragm 95 therebetween. It will thus be seen that the operating stem 89, in effect, has all of the diaphragms 95, 96, 97 and 98 secured thereto.

In order to support the operating stem 89 and relieve the diaphragms 95, 96, 97 and 98 of the weight of the operating stem 89 and of the spacing members 99, the operating stem 89 is provided with a guiding and supporting piston 102 which operates in a bore 100 in the relay valve casing section 61 and has at one side thereof the chamber 74 and at the opposite side thereof a chamber 104 to which the left-hand face of the diaphragm 95 is open. The piston 102 has a port or passage 103 therein for connecting chambers 74 and 104. A rod or shaft 105 is also provided to support the opposite end of the stack of diaphragms, which rod is secured to the smallest of the diaphragms 98 and which operates slidably in a bore 106 formed in the end casing section 62.

Formed between the largest diaphragm 95 and the adjacent smaller diaphragm 96 is a chamber 115 which is in constant communication with the timing chamber 65 through a passage and pipe 107. Formed between the diaphragm 96 and the adjacent smaller diaphragm 97 is a chamber 116 which is in constant communication with the timing chamber 66 through a passage and pipe 108. Formed between the diaphragm 97 and the smallest of the diaphragms 98 is a chamber 117 which is in constant communication with the timing chamber 67 through a passage and pipe 109. It will be understood that the volume or capacity of the chambers 65, 66 and 67 is relatively large compared to the volume of the respectively connected chambers 115, 116 and 117. The smallest of the diaphragms 98 closes a chamber 118 formed in the end casing section 62, and the chamber 118 is constantly connected to a pipe 77a, which will be hereinafter designated the primary control pipe, through a passage 111 and a branch passage and pipe 112. The primary control pipe 77a leads to and is constantly connected into the pressure chamber 15 of the self-lapping brake control device 8 and thus it will be understood that the pressure in chamber 118 of the control valve device 9 is always the same as the pressure in the pressure chamber 15 of the brake control device 8.

A plurality of magnet valve devices 125, 126 and 127, embodied in the magnet valve casing section 63 are provided for controlling the communication between the primary control pipe 77a and chambers 115, 116 and 117, respectively, and also for controlling communication through which fluid under pressure is vented to atmosphere from the chambers 115, 116 and 117, respectively.

The magnet valve device 125, hereinafter designated the high speed magnet valve device, comprises a pair of oppositely seating valves 119 and 120 connected by a fluted stem 121 and adapted to be operated by an electromagnet winding 122 through the medium of a plunger rod or stem 123. The valve 119, hereinafter called a supply valve, is contained in a chamber 129 of casing section 63, which chamber 129 is constantly connected to the passage 111 and thus to the primary control pipe 77a, and the valve 120, hereinafter called the release valve, is contained in a chamber 131 which is constantly open to atmosphere through a passage 132 and a choke 133. A chamber 134, disposed between the chambers 129 and 131 and through which the fluted stem 121 connecting the supply and release valves 119 and 120 extends, is constantly connected to the passage 107 leading to the chambers 115 and 65 by a branch passage 135. When the electromagnet winding 122 is energized, the valves 120 and 119 are accordingly simultaneously moved into seated and unseated positions, respectively, against the force of a biasing spring 136 contained in chamber 129. Spring 136 is effective to yieldingly urge the valves 119 and 120 into seated and unseated positions, respectively, when the electromagnet winding 122 is deenergized. It will thus be apparent that when the electromagnet winding 122 is energized, communication is opened for the supply of fluid under pressure from the primary control pipe 77a, past the unseated supply valve 119 into the chamber 134 and thence to the chambers 115 and 65. It will also be apparent that when the electromagnet 122 is deenergized, the timing chamber 65 and the diaphragm chamber 115 are vented to atmosphere past the unseated release valve 120 and through the choke 133.

The magnet valve device 126, hereinafter designated the intermediate speed magnet valve device, is identical in construction to the magnet valve device 125 and comprises a pair of oppositely seating supply and release valves 139 and 140 which are connected by the fluted stem 141 and actuated by an electromagnet winding 142 through the medium of a plunger rod or stem 143. The supply valve 139 is contained in a chamber 149 which is constantly connected to the passage 111 through a branch passage 150 and the release valve 140 is contained in a chamber 151 which is constantly open to atmosphere through a passage 152 containing a choke 153. Disposed between the chambers 149 and 151 is a chamber 144 through which extends the fluted stem 141 connecting the supply and release valves 139 and 140, the chamber 144 being constantly connected to the passage 108 leading to the diaphragm chamber 116 and the timing chamber 66 by a branch passage 145. Energization of the electromagnet 142 causes the valves 139 and 140 to be actuated to unseated and seated positions, respectively, against the force of a biasing spring 146 contained in the chamber 149. Spring 146 is effective to yieldingly urge the valves 139 and 140 into seated and unseated positions, respectively, when the electromagnet winding 142 is deenergized. It will thus be apparent that when the electromagnet winding 142 of the intermediate speed magnet valve device 126 is energized, communication is established through which fluid under pressure may be supplied from the primary control pipe 77a and passage 111 to the passage 108 leading to the diaphragm chamber 116 and the timing chamber 66. It will also be apparent that when the electromagnet winding 142 of the magnet valve device 126 is deenergized, communication is established through which the diaphragm chamber 116 and the connected timing chamber 66 are vented to atmosphere past the unseated release valve 140 and through the choke 153.

The magnet valve device 127, hereinafter designated the low speed magnet valve device, comprises a double beat valve 159 having a fluted stem 160 on opposite sides thereof and operated by an electromagnet winding 162 through the medium of a plunger rod or stem 163 adapted to engage the end of the upper fluted stem 160 of the double beat valve 159. The valve 159 is contained in a chamber 164 which is constantly connected through a branch passage 165 to the passage 109 leading to the diaphragm chamber 117 and the timing chamber 67. When the electromagnet winding 162 is deenergized, the double beat valve 159 is actuated to an upper seated position by a biasing spring 166, acting on the end of the lower fluted stem 160, to establish communication between the chamber 164 and a chamber 167, which is constantly connected by a branch passage 161 to the passage 111 and thus to the primary control pipe 77a. When the electromagnet winding 162 of the magnet valve device 127 is energized, the double beat valve 159 is actuated to a lower seated position to close the communication just described and open a communication between the chamber 164 and a chamber 171 which is constantly connected to atmosphere through a passage 172 containing a choke 173. It will thus be apparent that when the electromagnet winding 162 of the low speed magnet valve device 127 is deenergized, communication is established through which fluid under pressure may be supplied from the primary control pipe 77a to the diaphragm chamber 117 and the timing chamber 67. It will also be apparent that when the electromagnet winding 162 is energized, the supply communication just described is closed and the exhaust communication is established through which fluid under pressure is vented from the diaphragm chamber 117 and the timing chamber 67 to atmosphere through the choke 173.

The speed-responsive switch device 10 operates to control energization and deenergization of the magnet valve devices 125, 126 and 127. The speed-responsive switch device 10 may be of any suitable construction and is illustrated as comprising a casing 175 which is mounted in any desired location on the body of the car and having a chamber 176 containing a centrifugally operated device 177 for actuating a switch device 178. The centrifugally operated device 177 may comprise a rotary member 179 having a pair of projecting yokes 181 on diametrically opposite sides thereof, only one prong of each yoke being shown, and a pair of bell crank levers 182 carried between the prongs of each yoke 181, respectively, and pivotally mounted thereon by a pin 183. Each bell crank lever 182 carries a weight such as a fly-ball 184 at the outer end thereof, the inner end thereof being adapted to engage the lower face of a collar 185 secured to the lower end of the operating stem 186 of the switch device 178, within the chamber 176. A shaft 187, suitably journaled in the casing 175, carries the rotary member 179 at the inner end thereof and is adapted to be rotated according to the speed of travel of the car, either by connection to a car wheel axle or to the armature shaft of the usual generator carried on the car and driven from an axle of the car.

Secured in insulated relation to the upper part of the casing 175, which is broken away for clarity, are three pairs of contact fingers 191, 192 and 193. The operating stem 186 of the switch device 178 carries three contact members 194, 195 and 196 for engaging the pairs of contact fingers 191, 192 and 193, respectively, in bridging or circuit-closing relation.

Interposed in the chamber 176 between the wall of the casing 175 and the collar 185 secured to the operating stem 186 of the switch device 178 is a biasing spring 197 which yieldingly urges the operating stem 186 downwardly. The operating stem 186 of the switch device 178 may be of metal with the contact bridging members 194, 195 and 196 suitably insulated therefrom. However, for simplicity, the operating stem 186 may be of insulating material, as shown, so as to insulate the contact members 194, 195 and 196. The contact member 194 may be in the form of a strap or disc secured to the upper end of the operating shaft 186 by a nut 199. The contact members 195 and 196 are suitably mounted on the operating stem 196 for limited movement relative thereto. The contact members 195 and 196 may be either in the form of a strap or a disc having a central perforation through which the operating stem 186 extends and mounted on opposite sides of a flange 201 carried on the stem 186. A biasing spring 202, interposed between the flange 201 and the contact member 195, yieldingly urges the contact member 195 away from the flange 201, the contact member 195 being movable slidably along the operating stem and the extent of movement of the contact member 195 away from the flange 201 being limited by a stop flange 203 carried on the stem 186. In a similar manner a coil spring 204 interposed between the opposite side of the flange 201 and the contact member 196 yieldingly urges the contact member 196 slidably along the operating rod 186, the extent of movement of the contact member 196 away from the flange 201 being limited by a stop flange 205 carried on the operating stem 186.

Whenever the car is stopped and as long as the speed of travel of the car is less than a certain uniform relatively low speed, such as fifteen miles per hour, the tension of the biasing spring 197 is sufficient to actuate the operating stem 186 of the switch device 178 downwardly to effect disengagement of the contact member 194 from the contact fingers 191, disengagement of the contact member 195 from the contact fingers 192 and engagement of the contact member 196 with the contact fingers 193. As the speed of travel of the car increases above the certain uniform low speed, such as fifteen miles per hour, the centrifugal force acting on the weighted bell crank levers 182 overcomes the tension of the spring 197 and moves the operating stem 186 upwardly to effect disengagement of the contact member 196 from the contact fingers 193. The relation of the contact member 195 to the contact fingers 192 is such that engagement thereof is not effected until the speed of travel of the car exceeds an intermediate speed such as thirty-five miles per hour. The relation of the contact member 194 to contact fingers 191 is such that engagement thereof is not effected until the speed of travel of the car exceeds a certain uniform high speed, such as sixty miles per hour. It will be observed that when the operating stem 186 of the switch device 178 is actuated upwardly after the contact member 195 engages the contact fingers 192, the spring 202 yields to permit further upward movement of the operating stem 186 to effect engagement of the contact member 194 with the contact fingers 191 without imposing undue stress on the contact fingers 192.

As the car or train decreases from a speed in excess of the certain uniform high speed of, for example, sixty miles per hour, to a speed below the sixty miles per hour, the spring 197 becomes effective to urge the stem 186 downwardly to effect disengagement of the contact member 194 from the contact fingers 191. It will be observed, however, that since the spring 202 acting on the contact member 195 has been compressed the contact member 195 continues in engagement with the contact fingers 192. When the speed of travel of the car has reduced to the certain uniform intermediate speed of thirty-five miles per hour, sufficient downward movement of the operating stem 186 has been effected that the stop flange 203 engages the contact member 195 and thus effects disengagement of the contact member 195 from the contact fingers 192. Contact member 196 remains out of engagement with contact fingers 193 until the operating stem 186 is urged downwardly a sufficient degree by the biasing spring 197 to effect reengagement of the contact member 196 with the contact fingers 193, which occurs at the time the certain uniform low speed of, for example, fifteen miles per hour is reached. As the speed of travel of the car decreases below the uniform low speed of fifteen miles per hour, the biasing spring 197 is effective to urge the operating stem 186 still further downwardly in opposition to the centrifugal force acting on the bell crank levers 182 so that the spring 204 is yieldingly compressed, thus effecting good contact engagement between the contact member 196 and the contact fingers 193 and preventing the exertion of undue stress on the contact fingers 193.

Summarizing, as to the speed-responsive switch device 10, the contact member 196 only is in circuit-closing position when the car is traveling in a speed zone from, for example, fifteen miles per hour to zero speed. In the speed zone between fifteen miles per hour and, for example, thirty-five miles per hour, all of the contact members 194, 195 and 196 are in circuit-opening position. In the speed zone between, for example, thirty-five and sixty miles per hour, only the contact member 195 is in circuit-closing position. In the speed zone above sixty miles per hour, only the contact members 194 and 195 are in circuit-closing position.

The pneumatic switch device 11 may be of any suitable construction and is illustrated as comprising a casing 211 containing a piston 212 having a stem 213 carrying in insulated relation thereon a movable contact member 214 for connecting in bridging relation a pair of stationary contact fingers 215. At one side of the piston 212 is a chamber 216 which is connected to and supplied with fluid under pressure from the primary control pipe 77a. At the opposite side of the piston 212 is a chamber 217, containing a biasing spring 218 which is interposed between the wall of the casing 211 and the piston 212 and which yieldingly urges the piston downwardly to effect separation of the movable contact member 214 from the stationary contact fingers 215. When fluid under pressure is supplied to the chamber 216, the tension of the spring 218 is overcome and the piston 212 is moved to actuate the contact member 214 into circuit-closing engagement with the contact fingers 215. The tension of the biasing spring 218 is relatively light so that the contact member 214 engages the contact member 215 in response to a relatively low pressure in the chamber 216, such as one pound per square inch.

Control circuits

Having described the construction and the operating characteristics of the speed-responsive switch device 10 and the pneumatic switch device 11, the circuits whereby the energization and the deenergization of the magnet valve devices 125, 126 and 127 of the control valve device 9 are effected may now be briefly described.

The positive terminal of the battery 12 is connected to one of the contact fingers 215 of the pneumatic switch device 11 by a wire 206, the opposite or negative terminal of the battery 12 being connected to ground by a wire 207. One of the contact fingers 191, 192 and 193 of each of the pairs of contact fingers are connected together and to the remaining contact finger 215 of the pneumatic switch device 11, the one contact finger 193 being connected to the contact finger 215 by a wire 208, the one contact finger 191 being connected by a branch wire 209 to the wire 208 and the one contact finger 192 being connected to the branch wire 209 by a branch wire 210. The other contact fingers 191, 192 and 193 of each pair are connected, respectively, to one terminal of the high speed magnet valve device 125, one terminal of the intermediate speed magnet valve device 126 and one terminal of the low speed magnet valve device 127 by wires 221, 222 and 223, respectively. The opposite terminals of the electromagnet winding of the magnet valve devices 125, 126 and 127 are connected by a common wire 224 to ground, the wire 224 being connected directly to the terminal of the electromagnet winding of the magnet valve device 127, the terminal of the electromagnet winding of the magnet valve device 126 being connected by a branch wire 225 to the wire 224, and the terminal of the electromagnet winding of the magnet valve device 125 being connected to the wire 224 by a branch wire 226.

The wire 224 may be connected directly to the negative terminal of the battery 12 instead of to ground, but for convenience the connection of the wire 224 to the negative terminal of the battery 12 is shown as being made through ground. Furthermore, while the speed-responsive switch device 10 is shown as controlling the magnet valve devices 125, 126 and 127 of the control valve device 9 on only one car, the one speed-responsive device will, in practice, control the magnet valve devices of control valve devices 9 on other cars.

*Operation*

(a) *Charging.*—In operation, the equipment is charged with fluid under pressure from the main reservoir 6, fluid under pressure being supplied to the chamber 37 of the self-lapping brake valve device 8 through pipe 39 and pipe and passage 38, and to the chamber 68 of the control valve device 9 through pipes 39 and 38, feed valve device 69, feed valve pipe 71, and branch pipe 72.

(b) *Application of the brakes.*—Assuming that the car or train of cars is traveling along the track at a speed in excess of a certain uniform high speed, such as sixty miles per hour, so that the equipment is conditioned, as shown in Figure 1, with the brakes released, the operator initiates an application of the brakes by turning the operating handle 47 of the brake control device 8 from release position into the application zone a desired amount. The brake control device 8 then operates, in the manner previously described, to charge the pressure chamber 15 and thus the primary control pipe 77a with fluid under pressure, the ultimate pressure attained being determined by the position of the operating handle 47 in the application zone. If, as is assumed, the car or train is traveling in excess of sixty miles per hour, the speed-responsive switch device 10 is actuated to the position shown in Figure 1, wherein contact member 194 engages contact fingers 191 and contact member 195 engages the contact fingers 192, while contact member 196 is raised out of engagement with the contact fingers 193. Upon the supply of fluid under pressure to the primary control pipe 77a, the pressure of the fluid supplied therefrom to the chamber 216 of the pneumatic switch device 11, effects the actuation of the movable contact member 214 into engagement with the contact fingers 215.

A circuit for energizing the electromagnet windings 122 and 142 of the magnet valve devices 125 and 126 is accordingly completed, the circuit extending from the positive terminal of the battery 12 through wire 206, contact fingers 215 and contact member 214 of the pneumatic switch device 11, wires 208 and 209 to the point 228, where the circuit divides into two branches, the one branch extending through the wire 209, contact fingers 191 and contact member 194 of the speed-responsive switch device 10, wire 221, electromagnet winding 122 of the magnet valve device 125, wires 226 and 224, and thence through the ground connection at 229 to the negative terminal of the battery 12. The other branch of the circuit extends from the point 228 through the wire 210, contact fingers 192 and contact member 195 of the speed-responsive switch device 10, wire 222, electromagnet winding 142 of the intermediate speed magnet valve device 126, wires 225 and 224, and thence to the negative terminal of the battery 12 through ground.

The high speed magnet valve device 125 is accordingly actuated to seat the release valve 120 and unseat the supply valve 119, while the intermediate speed magnet valve device 126 is actuated to seat the release valve 140 and unseat the supply valve 139. Fluid under pressure is thus supplied from the primary control pipe 77a simultaneously to the chamber 115 between the diaphragms 95 and 96 and to the connected timing chamber 65, as well as to the chamber 116 between the diaphragms 96 and 97 and the timing chamber 66 under the control of the magnet valve devices 125 and 126, respectively. Fluid under pressure is supplied to the chamber 115 and the connected timing chamber 65 from the primary control pipe 77a through the branch pipe and passage 112, passage 111, chamber 129 of the magnet valve device 125, past the unseated supply valve 119, through chamber 134, and passages 135 and 107. Fluid under pressure is supplied to the chamber 116 and the connected timing chamber 66 from the primary control pipe 77a through the branch pipe and passage 112, passage 111, branch passage 150, chamber 149 of the magnet valve device 126, past the unseated supply valve 139, through chamber 144, and passages 145 and 108.

Since the contact member 196 is disengaged from the contact fingers 193 of the speed-responsive switch device 10, the circuit for energizing the electromagnet winding 162 of the low speed magnet valve device 127 is interrupted and consequently the magnet valve device 127 is so conditioned that the valve 159 thereof is in its upper seated position, as shown in Fig. 1, wherein it establishes communication for the supply of fluid under pressure from the primary control pipe 77a to the chamber 117 between the diaphragms 97 and 98 and the timing chamber 67 connected thereto, the fluid flowing from the primary control pipe 77a through the branch pipe and passage 112, passage 111, branch passage 161, chamber 167 of the magnet valve device 127, past the valve 159, through chamber 164 and passages 165 and 109.

The chamber 118 at the right of the diaphragm 98, being connected to the passage 111, is constantly charged with fluid under pressure from the primary control pipe 77a.

It will thus be seen that all of the chambers 115, 116, 117 and 118 are charged with fluid under pressure from the primary control pipe 77a and, consequently, that the fluid pressure forces acting on opposite sides to the diaphragms 96, 97 and 98 are balanced. With the release slide valve 82 in the release position shown in Fig. 1, the chamber 104 at the left-hand side of the diaphragm 95 is at atmospheric pressure, chamber 104 being connected to slide valve chamber 74 through the port or passage 103 in the guiding piston 102. As a result of the unbalance of the fluid pressure forces in the chambers 104 and 115 on the left and right-hand sides of the diaphragm 95, respectively, the stack of diaphragms and the valve operating stem 89 are urged in the left-hand direction. In moving in the left-hand direction, the operating stem 89 first shifts the release valve 82 to cover the exhaust port or passage 79 and then engages the projecting stem 88 of the supply valve 81 and unseats the valve 81 against the force of the return spring 86. Fluid under pressure is accordingly supplied from the feed valve pipe 71 to the secondary control pipe 77 through branch pipe 72, chamber 88, past the unseated valve 81, through the passage 80, slide valve chamber 74, port 75 and branch pipe 76. Since the pressure in the secondary control pipe 77 determines the pressure in the brake cylinder 7, either directly, as shown, or indirectly through relay equipment in the manner shown and described in my copending application Serial No. 741,063 above referred to, the brake cylinder pressure is thus simultaneously built up according to the build-up of pressure in the secondary control pipe 77 to effect application of the brakes.

The pressure in the chamber 104 at the left-hand side of the diaphragm 95 builds up simultaneously in accordance with the build-up pressure in the slide valve chamber 74 and consequently exerts a force on the diaphragm 95 in opposition to the force of the fluid pressure in the chamber 115 acting on the right-hand face of the diaphragm 95. As the pressure of the fluid, in pounds per square inch, in the chamber 104 and accordingly in the secondary control pipe 77, substantially equals the pressure, in pounds per square inch, of the fluid in the chamber 115, return spring 86 acting on the supply valve 81 becomes effective to shift the operating stem 89 and the stack of diaphragms to the right-hand direction an amount sufficient to permit seating of the valve 81. The supply of fluid under pressure from the feed valve pipe 71 into the secondary control pipe 77 is thus immediately cut-off and further movement of the operating stem 89 and stack of diaphragms in the right-hand direction is stopped so that the release valve 82 remains in lap position covering the exhaust port or passage 79.

The brakes are thus applied to a degree as determined by the pressure of the fluid supplied to and maintained in the brake cylinder 7.

If it is desired to increase the brake cylinder pressure and accordingly the degree of the application of the brakes, the operating handle 47 of the brake control device 8 may again be operated to a further extent into the application zone, whereupon the pressure of the fluid in the primary control pipe 77a and in the chambers 115, 116, 117 and 118 is correspondingly increased. Due to the increase of pressure in the fluid in the chamber 115 acting on the right-hand face of the diaphragm 95, the stack of diaphragms and the operating stem 89 are again urged in the left-hand direction to unseat the supply valve 81. Fluid under pressure is thus again supplied from the feed valve pipe 71 into the secondary control pipe 77 to effect a corresponding increase in the pressure in the brake cylinder 7. When the pressure of the fluid in the secondary control pipe 77 and consequently in the chamber 104 at the left-hand side of the diaphragm 95 becomes substantially equal to the increased pressure of the fluid in chamber 115 at the right-hand side of the diaphragm 95, the return spring 86 again becomes effective to shift the valve 81 into its seated position to close off the further supply of fluid under pressure to the secondary control pipe 77, the operating stem 89 being shifted in the right-hand direction only sufficiently to permit seating of the valve 81, without shifting the release valve 82 sufficiently to uncover the exhaust port 79.

A full application of the brakes to a maximum degree is effected by rotating the operating handle 47 to its fullest extent into the application zone so that the primary control pipe 77a is charged to the full main reservoir pressure. The stack of diaphragms is then shifted to the left-hand direction to cause unseating of the supply valve 81 and the further supply of fluid under pressure from the feed valve pipe 71 to the secondary control pipe 77. Since the main reservoir pressure is customarily a certain number of pounds per square inch higher than the pressure as regulated by the feed valve device 69, the ultimate pressure attained in the secondary control pipe 77 and thus in the chamber 104 at the left-hand side of the diaphragm 95 may not be built up sufficiently so that the return spring 86 can shift the supply valve 81 back to seated position. The supply valve 81 thus remains unseated for a full application of the brakes until such time as the pressure of the fluid in any of the chambers 115, 116 and 117 varies to cause shifting of the diaphragms back in the right-hand direction, in the manner to appear presently.

As the speed of the train reduces under the application of the brakes effected in the manner just described, the force urging the switch element 178 of the speed-responsive switch device 10 upwardly gradually decreases until the speed of the train reduces below the certain uniform high speed, previously mentioned, such as sixty miles per hour. The contact member 194 then disengages the contact fingers 191 and thereby interrupts the circuit for energizing the electromagnet winding 122 of the high speed magnet valve device 125. The magnet valve device 125 is accordingly actuated to the position shown in Fig. 1, wherein the supply valve 119 is seated and the release valve 120 is unseated. Fluid under pressure is accordingly vented from the chamber 115 and the connected timing chamber 65 to atmosphere through the passage 107, branch passage 135, chamber 134 of the magnet valve device 125, past the unseated release valve 120, chamber 131, passage 132 and choke 133. Although not apparent from Fig. 1, it should be understood that the volume of the timing chamber 65 may be many times greater than the volume of the chamber 115 and thus the pressure of the fluid in the chamber 115 is only gradually reduced through the choke 133.

The reduction of the pressure of the fluid in the chamber 115 creates a differential force on the diaphragm 96 urging it in the left-hand direction, the degree of the force increasing as the pressure in the chamber 115 reduces relative to the pressure in the chamber 116 which is maintained. However, since the diaphragm 95 has a larger pressure area than diaphragm 96, the differential force of the pressures in chambers 104 and 115 urging the diaphragm 95 in the right-hand direction caused by initial reduction of the pressure of the fluid in chamber 115 results in a greater differential force urging the diaphragms in the right-hand direction as compared to the differential force urging the diaphragms in the left-hand direction. Thus the stack of diaphragms and the operating stem 89 are shifted in the right-hand direction to cause the release valve 82 to uncover the exhaust port 79.

The rate of reduction in the pressure of fluid in chamber 115, as determined by the choke 133, is less than the rate of reduction in the pressure of the secondary control pipe 77 and the chamber 104 through exhaust port 79 and thus when the pressure of the fluid in the secondary control pipe 77 and in the chamber 104 of the control valve device 9 is so reduced that the differential force urging the diaphragm 95 in the right-hand direction becomes less than the differential force urging the diaphragm 96 in the left-hand direction, the stack of diaphragms and the operating stem 89 will be shifted in the left-hand direction so that the slide valve 82 is moved to cover the exhaust port 79 and cut-off the further release of fluid under pressure from the secondary control pipe 77, and the chamber 104.

However, as the reduction of the pressure of the fluid in the chamber 115 further continues, the differential force urging the diaphragm 95 in the right-hand direction again becomes greater than the differential force of the fluid pressure in chambers 115 and 116 urging the diaphragm 96 in the left-hand direction so that the diaphragms and the stem 89 are again shifted in the right-hand direction to cause slide valve 82 to uncover exhaust port 79 and thus effect further release of fluid under pressure from the secondary control pipe 77 and chamber 104.

As the pressure in the chamber 104 is reduced more rapidly through the exhaust port 79 than fluid pressure in chamber 115 is reduced through choke 133, the differential force urging diaphragm 95 to the right-hand direction again becomes less than the differential force of the fluid pressure in chambers 115 and 116 urging the diaphragm 96 in the left-hand direction, so that the stack of diaphragms and stem 89 are again shifted to the left-hand direction to cause the slide valve 82 to cover the exhaust port 79.

It will be thus seen that the secondary control pipe pressure and correspondingly the brake cylinder pressure is reduced at a rate governed by the rate of reduction of the pressure of the fluid in chamber 115 and the connected timing chamber 65.

The capacity of the timing chamber 65 relative to the chamber 115, and the size of the choke 133 are suitably designed so that the chamber 115 will be completely vented to atmosphere when the speed of travel of the car or train is reduced under the brake application to a speed slightly above the certain uniform intermediate speed of thirty-five miles per hour. When the chamber 115 and the connected timing chamber 65 are completely vented to atmosphere, the force urging the stack of diaphragms in the right-hand direction is determined by the secondary control pipe pressure acting in chamber 104 on the effective area of the diaphragm 95 whereas the force urging the stack of diaphragms in the left-hand direction is determined by the pressure of the fluid in the chamber 116 acting over the effective area of the diaphragm 96.

The pressure to which the secondary control pipe pressure and the pressure in the chamber 104 is reduced, with the diaphragm chamber 115 completely vented, and the chambers 116, 117 and 118 still maintained charged at the pressure of the primary control pipe 77a, compares to the pressure in the primary control pipe in the same ratio as the effective area of the diaphragm 96 compares to the effective area of the diaphragm 95. The reason for this should be obvious since it requires a lesser pressure in the chamber 104 acting over the larger area of the diaphragm 95 to balance a higher pressure acting in chamber 116 on the smaller area of the diaphragm 96.

Assuming that the primary control pipe is charged to a pressure of one hundred pounds per square inch and that the effective area of the diaphragms 95, 96, 97 and 98 may be expressed as three, two, one and one-half, and one units of area, respectively, the secondary control pipe pressure and thus the brake cylinder pressure will bear a ratio to the one hundred pounds primary control pipe pressure of two to three, that is, it will be substantially sixty-six pounds per square inch.

When the speed of a car or train reduces below the intermediate uniform speed of thirty-five miles per hour, the contact member 195 of the speed-responsive switch device 10 disengages the contact fingers 192, thereby interrupting the circuit for energizing the electromagnet winding 142 of the intermediate speed valve device 126. The supply valve 139 and the release valve 140 of the magnet valve device 126 are accordingly actuated to seated and unseated positions, respectively, to cut-off the supply of primary control pipe pressure to the chamber 116 and the timing chamber 66 at the seated valve 139, while at the same time opening the exhaust communication at the unseated valve 140 through which fluid under pressure is vented from the chamber 116 and connected timing chamber 166 to atmosphere. Fluid under pressure is vented from chamber 116 and connected timing chamber 66 to atmosphere through the passage 108, branch passage 145, chamber 144, past the unseated release valve 140, chamber 151, passage 152, and choke 153.

When the pressure of the fluid in the chamber 116 reduces, the differential force of the pressure acting on the left-hand face of the diaphragm 95 in chamber 104 and the pressure acting on the right-hand face of the diaphragm 96 in chamber 116 and urging the stack of diaphragms in the right-hand direction exceeds the differential force of the fluid pressure in chambers 116 and 117 acting on the diaphragm 97 and urging the stack of diaphragms in the left-hand direction. The stack of diaphragms and the release slide valve 82 are shifted accordingly in the right-hand direction to uncover the exhaust port 79 and to a further extent to vent fluid under pressure from the secondary control pipe 77 and the chamber 104, to effect a corresponding reduction in brake cylinder pressure.

In the same manner as previously described for the reduction of the pressure in chamber 115, the stack of diaphragms is shifted alternately in the right-hand direction and in the left-hand direction depending upon whether the differential force of the pressure of the fluid on diaphragms 95 and 96 in the right-hand direction or the differential force on diaphragm 97 in the left-hand direction predominates. Thus secondary control pipe pressure and the pressure in the chamber 104 is reduced at a rate determined by the size of the timing chamber 66 and the size of the choke 153 which are so selected and designed that the chamber 116 and the timing chamber 66 will be completely vented to atmosphere by the time the car or train of cars is reduced to a speed slightly higher than the certain uniform low speed of fifteen miles per hour previously mentioned.

With both the chambers 115 and 116 completely vented to atmosphere and with the chambers 117 and 118 still charged to the pressure of the primary control pipe 77a, the force urging the stack of diaphragms to the left-hand direction, in opposition to the force of the fluid pressure in the chamber 104 acting on the left-hand face of the diaphragm 95, is that resulting from the pressure of fluid in the chamber 117 effective over the right-hand face of the diaphragm 97. The pressure to which the fluid in secondary control pipe 77 and chamber 104 is reduced at this point in the operation, will thus bear the same ratio to the pressure in the chamber 117, that is, primary control pipe pressure, as the area of the diaphragm 97 bears to the area of the diaphragm 95. If it is assumed that the area of the diaphragm 95 may be expressed as three units and the area of the diaphragm 97 may be expressed as one and one-half units, then the pressure in the secondary control pipe 77 will be half of that in the primary control pipe 77a. Thus, if the primary control pipe pressure is a hundred pounds per square inch, the secondary control pipe pressure will be fifty pounds per square inch.

As the speed of the travel of the car or train of cars decreases to below the certain uniform low speed of fifteen miles per hour, the contact member 196 engages the contact fingers 193 of the speed-responsive switch device 10 and completes the circuit for energizing the electromagnet winding 162 of the low speed magnet valve device 127. This circuit extends from the positive terminal of battery 12, through wire 206, contact fingers 215 and contact member 214 of the pneumatic switch device 11, wire 208, contact fingers 193 and contact member 196 of the speed-responsive switch device 10, wire 223, electromagnet winding 162 of magnet valve device 127, wire 224, and thence through ground to the negative terminal of battery 12.

Energization of the electromagnet winding 162 of the magnet valve device 127 effects actuation of double beat valve 159 to its lower position wherein the supply communication, previously described, is cut-off and communication is established through which fluid under pressure is vented to atmosphere from the chamber 117, between the diaphragms 97 and 98, and its connected timing chamber 67, fluid flowing out through the passage 109, branch passage 165, chamber 164, past the upper seat of valve 159, through chamber 171, passage 172, and choke 173.

When the pressure of the fluid in chamber 117 is reduced, as just described, the stack of diaphragms is urged in the right-hand direction by the differential force of the fluid pressure in chamber 117 acting on the right-hand face of the diaphragm 97 and the fluid pressure in chamber 104 acting on the left-hand face of diaphragm 95 in opposition to the lesser differential force of the pressure in chambers 117 and 118 acting on the diaphragm 98 and urging it in the left-hand direction. The stack of diaphragms and the valve operating stem 89 are accordingly shifted in the right-hand direction so as to move the valve 82 to uncover the exhaust port 79 and again further reduce the pressure in the secondary control pipe 77 and the chamber 104. As in the case of the reduction in the pressure of the fluid in the chambers 115 and 116, the stack of diaphragms is alternately shifted in the right-hand direction and in the left-hand direction, depending upon whether the differential force of the fluid pressure acting on the diaphragms 95 and 97 and urging the stack of diaphragms in the right-hand direction is greater or less than the differential force of the fluid pressure acting on the diaphragm 98 and urging the stack of diaphragms in the left-hand direction. Accordingly, the secondary control pipe pressure and the pressure in the chamber 104 is reduced at a rate which is governed by the rate of reduction of the fluid pressure in the chamber 117, the brake cylinder pressure being correspondingly reduced.

The size of the choke 173 and the volume of timing chamber 67 relative to the volume of chamber 117 is so designed that the pressure in chamber 117 is reduced to atmospheric pressure, that is the chamber 117 is completely vented, when the train of cars is traveling at, for example, only two or three miles per hour just before the car or train comes to a complete stop.

With the chambers 115, 116 and 117 completely vented and the chamber 118 still charged at the pressure in the primary control pipe 77a, the pressure to which the secondary control pipe pressure and the pressure in the chamber 104 is reduced bears the same relation to the pressure in the chamber 118 and in the primary control pipe 77a as the area of the diaphragm 98 bears to the area of the diaphragm 95. If it is assumed that the area of the diaphragm 95 is expressed as three units of area and the area of the diaphragm 98 is expressed as one unit of area, then the pressure in the secondary control pipe 77 will be one-third that in the primary control pipe 77a. If the primary control pipe pressure be a hundred pounds per square inch, then the secondary control pipe pressure will be approximately thirty-three pounds per square inch at the time the car or train is brought to a complete stop. The brake cylinder pressure will thus be reduced to a pressure in accordance with that in the secondary control pipe 77a.

It will thus be understood that when an application of the brakes is initiated at the time the train is traveling in excess of a certain uniform high speed of, for example, sixty miles per hour, a pressure in the secondary control pipe 77 and in the brake cylinder 7 is initially established which is substantially equal to the pressure in the primary control pipe 77a as determined by the degree to which the operating handle 47 of the brake control device 8 is moved out of release position into the application zone and that the pressure in the secondary control pipe and in the brake cylinder 7 is automatically gradually reduced under the control of valve device 9 until at the time the car or train is brought to a stop the pressure in the secondary control pipe 77 and correspondingly in brake cylinder 7 is only a fraction of the pressure in the primary control pipe 77a. It will be further understood that the operation of the control valve device 9 is such as to reduce the pressure in the secondary control pipe and in the brake cylinder, as the speed of travel of car or train reduces, without any change in the pressure in the primary control pipe. Thus the operator may fix the pressure in the primary control pipe 77a and the control valve device 9 automatically adjusts the pressure in the secondary control pipe 77 and the brake cylinder 7 to a value which is proportional to the pressure maintained in the primary control pipe and which is gradually reduced as the speed of travel of the car or train reduces under the application of the brakes.

If the pressure in the primary control pipe is established and maintained at a certain pressure, the control valve device 9 effects gradual reduction in the secondary control pipe pressure and in brake cylinder pressure along a uniform curve. If the primary control pipe pressure is fixed at a pressure higher or lower than the certain pressure, then the control valve device 9 gradually reduces the secondary control pipe pressure and the brake cylinder pressure along uniform curves higher or lower, respectively, than that for the certain pressure in the primary control pipe. If the operating handle 47 of the brake control valve device 8 is shifted in the application zone, during the application of the brakes, the pressure in the chambers 115, 116, 117 and 118 changes accordingly so that the reduction in the secondary control pipe pressure and in the brake cylinder pressure is always along a uniform curve for a given primary control pipe pressure.

If the application of the brakes is initiated at the time that the car or train is traveling at a speed below the uniform high speed such as sixty miles per hour, and above the intermediate uniform speed of thirty-five miles per hour, the magnet winding 122 of the high speed magnet valve device 125 is not energized, due to the fact the contact member 194 of the speed-responsive switch device 10 is not raised sufficiently to engage the contact fingers 191. Therefore the chamber 115 between the diaphragms 95 and 96 and its connected timing chamber 65 remains vented to atmosphere past the unseated valve 120. Consequently, instead of an initial secondary control pipe pressure being obtained which is substantially equal to the primary control pipe pressure, the initial secondary control pipe pressure will bear a ratio to the primary control pipe pressure established which is equal to the ratio of the area of the diaphragm 96 to the area of the diaphragm 95. If the same illustrative diaphragm areas are used as in the previously described operation, that is, if the diaphragm 95 is of three units of area and diaphragm 96 is of two units of area, and if the primary control pipe is charged to a pressure of one hundred pounds per square inch, then the initial pressure obtained in the secondary control pipe, and correspondingly in the brake cylinder 7, will be two-thirds of the primary control pipe pressure, that is two-thirds of one hundred pounds per square inch, or substantially sixty-six pounds per square inch.

As the speed of travel of the car or train subsequently reduces, the operation of the control device 9 thereafter is identical with that previously described and it is, therefore, not repeated here.

In a similar manner, if an application of the brakes is initiated when the car or train is traveling at a speed below the intermediate uniform speed of thirty-five miles per hour, but above the certain uniform low speed of fifteen miles per hour, then both the high speed magnet valve device 125 and the intermediate speed magnet valve device 126 are not energized upon the operation of the pneumatic switch device 11 to cause actuation of the contact member 214 to circuit-closing position. Consequently, both of the chambers 115 and 116 remain vented to atmosphere, while only the chambers 117 and 118 are charged with fluid under pressure from the primary control pipe 77a. Thus, the initial pressure obtained, in such case, in the secondary control pipe 77 and in the brake cylinder 7 bears a ratio to the primary control pipe pressure which is equal to the ratio of the area of the diaphragm 97 to the area of the diaphragm 95. If it is assumed, as in previous instances, that the ratio of the area of the diaphragm 97 to the area of the diaphragm 95 is equal to the ratio of one and one-half to three, then the initial pressure obtained in the secondary control pipe and the brake cylinder 7 is one-half of one hundred pounds or fifty pounds per square inch.

Thereafter, as the speed of travel of the car or train reduces, the control valve device 9 operates, as previously described, to effect reduction of the pressure in the secondary control pipe 77 and accordingly in the brake cylinder 7 to a certain low value at the time the car or train is brought to a complete stop, the final secondary control pipe and brake cylinder pressure being different depending upon the pressure in the primary control pipe 77a but always bearing a ratio to the primary control pipe pressure which is equal to the ratio of the area of the smallest diaphragm 98 to the largest diaphragm 95.

In a similar manner, if an application of the brakes is initiated at a time that the car or train is traveling at speed below the certain uniform low speed of fifteen miles per hour, the electromagnet winding 122 of the low speed magnet valve device 127 is immediately energized upon the engagement of the contact member 214 with the contact fingers 215 of the pneumatic switch device 11, since the contact member 196 of the governor switch device 10 is already in engagement with the contact fingers 193. Accordingly, the magnet valve devices 125, 126 and 127 are conditioned to vent to atmosphere the chambers 115, 116 and 117, respectively. Thus only the chamber 118 is charged with fluid under pressure from the primary control pipe 77a and the initial pressure attained in the secondary control pipe 77 accordingly bears a ratio to the primary control pipe pressure which is equal to the ratio of the area of the diaphragm 98 to the area of the diaphragm 95. If, as assumed previously, the area of the diaphragm 98 and the area of the diaphragm 95 have a ratio of one to three, and if for example the primary control pipe pressure is one hundred pounds per square inch, then the initial secondary control pipe pressure attained is one-third of one hundred pounds per square inch or substantially thirty-three pounds per square inch. The pressure attained in the brake cylinder accordingly corresponds to that in the secondary control pipe 77.

If the primary control pipe pressure is not changed during the application of the brakes, the initial secondary control pipe pressure and brake cylinder pressure remains unchanged thereafter until such time as the pressure in the primary control pipe 77a is reduced by operation of the brake control device 8 or until the brakes are completely released by reduction of the primary control pipe pressure to atmospheric pressure, in the manner to be hereinafter described.

It will be seen that if the primary control pipe pressure is not changed after the train is brought to a standstill, the brakes remain applied to a degree in proportion to the pressure in the primary control pipe 77a and in substantially the same ratio to the pressure in the primary control pipe as the ratio of the area of the smallest diaphragm 98 to the area of the largest diaphragm 95.

If there is leakage from the brake cylinder and the secondary control pipe, the reduction of the pressure in the chamber 104 incident thereto results in shifting of the diaphragm in the left-hand direction by the primary control pipe pressure maintained in chamber 118 and acting on the right-hand face of diaphragm 98. If there is sufficient brake cylinder pressure leakage, the supply valve 81 will be unseated by the shifting of the diaphragm in the left-hand direction and fluid under pressure will be accordingly supplied from the feed valve pipe 71 to the secondary control pipe 77 and accordingly to the brake cylinder until the pressure acting in chamber 104 is again sufficient to cause shifting of the diaphragm in the right-hand direction to permit the supply valve 81 to reseat. Thus, control valve device 9 maintains brake cylinder pressure against leakage at all times. This is of particular advantage where the train is stopped on a grade and creepage of the train would result if the degree of application of the brakes were reduced by leakage of fluid under pressure from the brake cylinder.

It will also be apparent that the pressure in the primary control pipe may be increased to a maximum pressure by operation of the brake valve device 8 when the train is brought to a standstill, in order to increase the brake cylinder pressure and accordingly the degree of application of the brakes, to a maximum and thus provide adequate braking force to hold the train at a standstill on a grade.

Summarizing in part, it will be seen that the degree of the initial secondary control pipe pressure and the pressure in the brake cylinder will be greater or less depending upon the speed of travel of the car or train at the time the application of the brakes is initiated being greater or less, respectively, and that the secondary control pipe and brake cylinder pressure is gradually reduced from the initial pressure attained to a certain uniform low pressure which is proportional to the pressure established or maintained in the primary control pipe 77a.

(c) *Release of the brakes.*—Assuming that an application of the brakes has been effected, in the manner just described, and that the car has been brought to a complete stop, the brakes may be released completely prior to again putting the car in motion by shifting the operating handle 47 of the brake control device 8 into release position so as to completely vent fluid under pressure from the primary control pipe 77a. Since the chamber 118 at the right of the diaphragm 98 and the chamber 216 of the pneumatic switch device 11 are constantly connected to the primary control pipe 77a, reduction in the pressure in the primary control pipe to atmospheric pressure is accompanied by reduction of the pressure in the chamber 118 and 216 to atmospheric pressure.

As the pressure of the fluid in the chamber 118 reduces, the force of the pressure in the secondary control pipe and in the chamber 104 acting on the left-hand face of the diaphragm 95 becomes greater than the force of the pressure of the fluid in chamber 118 acting on the right-hand face of the diaphragm 98, and consequently the stack of diaphragms and the operating stem 89 are shifted in the right-hand direction to move the valve 82 to uncover the exhaust port 79. Fluid under pressure is accordingly vented from the secondary control pipe 77 and the chamber 104 and a corresponding reduction in brake cylinder pressure produced. Since the chamber 118 is relatively small compared to the chamber 104 and since the chamber 118 is vented at a relatively rapid rate, the pressure in the chamber 104 continues to predominate and maintain the stack of diaphragms and the operating stem 89 biased in the right-hand direction to such an extent that the slide valve 82 continues to uncover the exhaust port 79. Fluid under pressure is thus completely vented from the secondary control pipe and accordingly the brake cylinder 7 to cause complete release of the brakes.

It will be noted that when the pressure in the primary control pipe 77a is reduced to atmospheric pressure, the pneumatic switch device 11 is actuated to separate the contact member 214 from the contact fingers 215 and thus interrupt the energizing circuit for all of the magnet valve device 125, 126 and 127, thereby preventing the unnecessary consumption of electrical energy while the brakes are released.

*Modified type of control valve device as shown in Figs. 2, 3, and 4*

A modified type of control valve device 9a, shown in Figs. 2, 3 and 4, may be substituted for the control valve device 9 of Fig. 1. The entire control valve device 9a is not shown in Fig. 2, those parts of the control valve device 9a which are substantially identical in construction with corresponding parts in the control valve device 9 being omitted and only those parts which differ in construction from that shown in Fig. 1 for the control valve device 9 being shown in Fig. 2. The control valve device 9a is adapted to perform in a similar manner all the functions of the control valve device 9 and is also adapted to provide certain additional advantageous features. One of the advantageous features of the control valve device 9a is that it enables the rapid corresponding adjustment of the secondary control pipe pressure, and accordingly brake cylinder pressure, upon a reduction in the primary control pipe pressure under the control of the self-lapping brake valve device 8. Another advantageous feature of the control valve device 9a is that it functions upon application of the brakes at speeds below a certain uniform low speed to cause the pressure in the secondary control pipe 77, and accordingly in the brake cylinder 7, to be substantially equal to or in one to one ratio with the pressure in the primary control pipe 77a until such time as the brake shoes come into contact with the car wheels instead of in the ratio of the area of the smallest diaphragm of the stack to the area of the largest as in the control valve device 9.

It will be appreciated that in the event of an application of the brakes being effected in the brake system shown in Fig. 1 at a time that the car or train is traveling at a speed less than a certain uniform low speed, such as fifteen miles per hour, the control valve device 9 is so constructed and operates in such manner as to require the build-up of a pressure in the primary control pipe 77a to a relatively high pressure in order to cause a sufficient build-up of the pressure in the secondary control pipe 77 and accordingly in the brake cylinder 7 to move the brake shoes into contact with the car wheels. As is well known, it requires a build-up of the pressure in the brake cylinder to substantially five pounds per square inch in order to move the brake shoes into contact with the car wheels and thus if, as has been previously assumed, the ratio of the area of the largest diaphragm 95 of the control valve device 9 to the area of the smallest diaphragm 98 of the control valve device 9 is three to one, it follows that the control valve device 9 necessitates a build-up of pressure in the primary control pipe 77a to a pressure of fifteen pounds per square inch in order to cause a pressure of five pounds per square inch to be built up in the secondary control pipe 77 and accordingly in the brake cylinder 7.

It will be apparent therefore, that it is desirable to cause an equal pressure in the secondary control pipe 77 as compared with the pressure in the primary control pipe 77a in the case of applications of the brakes initiated at the time that the train or car is traveling at a relatively low speed, in order to insure rapid response to the initiation of an application of the brakes.

The provision of the features just described is accordingly among the objects of my invention.

Referring to Fig. 2, the essential differences in the construction of the control valve device 9a over the control valve device 9 comprise the provision of a modified form of relay valve casing section 61a in place of the casing section 61, the casing section 61a having embodied therein a modified form of relay valve mechanism 241, a single casing section 62a instead of the plurality of diaphragm clamping casing sections 62, and a plurality of movable abutments or diaphragms 295, 296, 297 and 298 mounted in the casing 62a and corresponding to the diaphragms 95, 96, 97 and 98, respectively, of the control valve device 9, the diaphragms 295, 296, 297 and 298 being entirely unconnected with each other as compared to the diaphragms 95, 96, 97 and 98 which are connected together. Further differences in the construction of the control valve device 9a over the control valve device 9 comprise the provision of an end casing section 70 adapted to carry an additional movable abutment or diaphragm 299 and associated lever mechanism which will be described presently and which functions to cause build-up of pressure in the secondary control pipe 77 equally with the build-up of pressure in the primary control pipe 77a until the brake shoes contact the car wheels.

The control valve device 9a also includes a plurality of check valves 495, 496 and 497 in the casing section 62a for permitting or enabling the rapid adjustment of the fluid pressure in the chambers between the diaphragms upon a reduction in the pressure in the primary control pipe 77 under the control of the self-lapping brake valve device 8.

Referring, in further detail to Fig. 2, the relay valve casing section 61a has a circular bore 243 in the clamping face thereof in which is supported and guided a follower disc 244 for the largest of the diaphragms 295. A plurality of bores 245, 246 and 247 which open into the bore 243 are also formed in the casing 61a, the bores being disposed side by side in a row in parallel relation (Fig. 4). The bores 245 and 246 are open to each other at the outer ends thereof through a slot 248 in the casing and the bores 246 and 247 are similarly connected at the outer ends thereof through a slot 249 in the casing. Formed in the casing 61a is a chamber 251 which is constantly connected to feed valve pipe 71 through the branch pipe 72 and which is connected to the inner end of the bore 247 through a bore or passage 252. Contained in the chamber 251 is a supply valve 253 having a fluted stem 254 which slides in the bore 252 and extends into the bore 247, the valve 253 being yieldingly urged into seated relation on an associated valve seat to close the connection between the chamber 251 and the bore 247 through the passage 252 by a coil spring 255 which is interposed between the valve 253 and the screw plug 256 closing the chamber 251.

Contained in and slidably operable in the bore 245 is a piston 257 having a valve member 258, which is formed on or secured thereto and which will be hereinafter designated the release valve. The release valve 258 has a fluted stem 259 which is guided in a bore 261, the bore 261 being constantly open to atmosphere through an exhaust port 262.

A chamber 263 formed in the bore 245 between the inner end of the bore and the piston 257, which chamber 263 is constantly connected to the secondary control pipe 77 through a branch pipe and passage 76, is connected to atmosphere through the bore 261 and port 262 when the release valve 258 is unseated from an associated valve seat, on the casing 61a, surrounding the bore 261. When the release valve 258 is seated on its associated valve seat, the communication of the chamber 263, and thus of the secondary control pipe 77, with the atmosphere through the exhaust port 262 is closed.

Operation of the application or supply valve 253 and of the release valve 258 is effected by a floating lever 265 which is pivoted intermediate the ends thereof, by a bearing 266 shown as of a ball-bearing type, on a pin 267 which is carried on a plunger 268, the plunger 268 being formed at one end as a piston 269 which slidably operates in the bore 246 which is between the bores 245 and 247.

The pin 267 is inserted in and secured in a transverse bore or hole 271 extending through two spaced parallel portions 272 of the plunger 268, with the floating lever 265 carried on the pin 267 in the space between the parallel portions 272 of the plunger. The lever 265 is so positioned as to have one arm thereof extend through the slot 248 into the bore 245 and the other arm extend through the slot 249 into the bore 247. Slidable in a reduced inner end portion of the bore 247 is a fluted spacer 275, one end of which engages the end of the fluted stem 254 of the supply valve 253 and the other end of which is adapted to be engaged by the rounded end of the arm of lever 265 in the bore 247.

The outer portion of the bore 247 is threaded to receive a stop screw 276 and a locking screw 277, a lock disc 278, Fig. 5, being interposed between the stop screw and the locking screw which has a tongue 279 extending into the slot 279 to prevent rotation of the lock disc 278 upon tightening of the locking screw 277.

The opposite arm of the floating lever 265 is rounded at the end and forked to straddle a stem 281 secured to the piston 257 carrying the release valve 258, the stem 281 having two spaced collars or flanges 282 and 283, between which the rounded forked end of the arm of the lever 265 is held.

A biasing spring 285, interposed in the bore 246 between the casing and the inner end of the plunger 268 on the interior of the piston 269 formed at the end of the plunger 268, yieldingly urges the plunger 268 in the right-hand direction, the outer end of the plunger 268 having a rounded head 286 thereon which is adapted to contact the face of the follower member 244 associated with the largest diaphragm 295.

A bezel ring 287 suitably secured to the casing at the outer end of the bore 245 serves as a stop to limit the movement of the piston 257 outwardly of the bore 245.

When force is applied to the diaphragm follower 244 by means of fluid pressure acting on the diaphragms 295, 296, 297 and 298 in the manner similar to that previously described for the diaphragms of the control valve device 9, the plunger 268 is shifted in the left-hand direction against the force of the spring 285. The biasing spring 255 holding the supply valve 253 seated, is sufficiently strong to hold the end of the arm of the lever 265 between the fluted spacer 275 and the stop screw 276 against initial movement. Thus, the lever 265 fulcrums at the lower end thereof, and the opposite or forked end of the lever 265 is moved in a left-hand direction to shift the piston 257 and the release valve 258 into seated relation on its associated valve seat to close the connection of the chamber 263 with the atmosphere through the port 262.

Further movement of the plunger 268 in the left-hand direction results in the pivoting of the lever 265 at the upper forked end thereof, which is prevented from moving further in the left-hand direction after the release valve 258 seats, to cause the lower end of the lever 265 to be shifted in the left-hand direction and thus, through the fluted spacer 275 and the valve stem 254 to effect unseating of the supply valve 253.

Upon the relief of the force applied to the follower 244, spring 285 returns the plunger 268 in the right-hand direction. The biasing spring 255 acting on the supply valve 253 then becomes effective to reseat the supply valve 253 while at the same time maintaining the release valve 258 seated by pivotal action of the lever 265 on the pin 267. As the plunger 268 continues to move in the left-hand direction after the supply valve 253 is seated, the lower end of lever 265 engages the stop screw 276 and the lever is thus pivoted at the lower end thereof in a clockwise direction to shift the piston 257, and the release valve 258 in the right-hand direction so that the release valve 258 is unseated from its associated valve seat and the connection of the chamber 263 to atmosphere through the port 262 again established.

The casing section 62a which is secured between the casing section 61a and the end casing section 70 in any suitable manner as by stud bolts 338 provided at opposite ends with nuts 340 has therein a stepped bore 288, one end of which opens at the clamping face of the casing section 62a engaging the casing section 61a and the opposite end of which is open to a chamber 398 which is in turn open at the opposite face of the casing section 62a.

A plurality of clamping rings 291, 292 and 293 of successively smaller diameters are provided for fitting closely into the portions of the stepped bore 288 of corresponding diameter for clamping the diaphragms 296, 297 and 298 respectively. The largest diaphragm 295 is suitably clamped between the clamping faces of the casing sections 61a and 62a.

Each of the diaphragms 295, 296, 297 and 298 is provided with a projection 294 at the center thereof for closely fitting into a cooperating recess at the center of follower plates or discs 301, 302, 303 and 304 respectively.

The follower disc 301 is associated with the right-hand face of the largest diaphragm 295 and is provided with a peripheral skirt or flange 306 having ports 307 therein, the skirt 306 being adapted to engage the clamping ring 291 to limit the movement of the diaphragm 295 in the right-hand direction.

The follower disc 302 is associated with the left-hand face of the diaphragm 296 and has a central projection 308 and a peripheral skirt or flange 309 having one or more ports 310 therein, the end of the projection 308 and the end of the flange 309 being adapted to engage the follower plate or disc 301 on the right-hand face of the diaphragm 295.

In a similar manner, the follower disc 303 is associated with the left-hand face of the diaphragm 297 and is provided with a central projection 311 and a peripheral skirt or flange 312 having one or more ports 313 therein, the outer end of the projection 311 and the edge of the flange 312 being adapted to engage the right-hand face of the diaphragm 296. In a similar manner also the follower disc 304 is associated with the left-hand face of the diaphragm 298 and has a central projection 314 and a peripheral skirt or flange 315 provided with one or more ports 316, the end of the projection 314 and the edge of the flange 315 being adapted to contact the right-hand face of the diaphragm 297.

Associated with the right-hand face of the smallest diaphragm 298 is a follower disc 318 having a plurality of holes for receiving projections 319 on the right-hand face of the diaphragm 298.

There is thus formed between the diaphragms 295 and 296 a chamber 395, between the diaphragms 296 and 297 a chamber 396, and between the diaphragms 297 and 298 a chamber 397, which are connected to timing chambers 65, 66 and 67 in casing 64, not shown, through passages 107, 108 and 109, respectively, which passages correspond to the passages 107, 108 and 109 of the control valve device 9 shown in Fig. 1. Magnet valve devices, not shown, corresponding to the magnet valve devices 125, 126 and 127 of Fig. 1, act to control the supply of fluid under pressure from the primary control pipe 77a into said passages 107, 108 and 109, respectively and the release of fluid under pressure from said passages in the same manner as in Fig. 1.

Formed in the casing section 62a are a plurality of chambers 325, 326 and 327, which chambers are open to each other and which are connected to the chamber 398 in the casing section 62a through a passage 331. The passage 107 is open to the chamber 325 through a branch passage 335, the passage 108 is open to the chamber 326 through a branch passage 336 and the passage 109 is open to the chamber 327 through a branch passage 337.

The check valves 495, 496 and 497, previously mentioned, are contained in and suitably guided in the chambers 325, 326 and 327, respectively, and are each yieldingly biased by a coil spring 494 into seated relation on an annular rib seat 493 to prevent back flow of fluid under pressure from the chamber 325 to the passage 335, from the chamber 326 to the passage 336, and from the chamber 327 to the passage 337, respectively, while at the same time being adapted to permit flow of fluid under pressure therepast in the opposite direction.

The chamber 398 is constantly connected to the primary control pipe 77a through the passage 111, corresponding to the passage 111 of the control valve device 9 shown in Fig. 1.

The outer opening of the chamber 398 in the casing section 62a, is closed by the end casing section 70 which is secured to the casing section 62a, by the stud bolts 338. On the inner face of the casing section 70 is a recess or chamber 339 which is closed at the inner end thereof by the diaphragm 299. The diaphragm 299 is secured at the periphery thereof by means of a clamping ring 341 which is secured to the inner face of the casing section 70 by a plurality of screws or bolts 342. The chamber 339 is constantly open to atmosphere through a port 344 in a stop screw 345 turned into a threaded opening 346 in the wall of the casing 70, the stop screw 345 being locked in a desired position by a lock nut 347.

The diaphragm 299 is clamped centrally thereof between two follower discs 348 and 349 on opposite sides thereof, the disc 348 having a threaded stem 351 which extends through a central opening in the diaphragm and in the follower disc 349 and which has a suitable nut 352 on the end thereof for applying clamping pressure to the follower discs. A pair of spaced levers 353 are provided, as shown in Fig. 3, which are each pivotally mounted intermediate the ends thereof on a pin 354 carried on projecting lugs 355 formed on the clamping ring 341. One end of each of the levers is pivotally connected by a pin 357 to projecting lugs 356 formed on or secured to the follower disc 348 associated with the diaphragm 299. A lever 359 disposed between the spaced levers 353, is pivotally connected at one end to the opposite end of both the levers 353 as by a pin 361.

The opposite end of the lever 359 is provided with a recess 363 in which one end of a stem 364 is received, the stem 364 extending through a suitable opening 365 in the clamping ring 341 and having a rounded or spherical head 366 at the opposite end thereof guided in a suitable bore 367 in the casing section 70. The stem 364 carries a collar or flange 368, which is secured thereto as by a press fit, and a biasing spring 369 interposed between one face of the flange 368 and the wall of the casing section 70 serves to normally yieldingly urge the stem 364 in the left-hand direction until the flange 368 engages the clamping ring 341.

A pair of projecting lugs 371 secured to or formed on the clamping ring 341 adjacent the stem 364, extend outwardly on opposite sides of the lever 359 to prevent lateral displacement of the end of the lever which engages the stem 364.

Formed on or secured to the lever 359 substantially centrally between the ends of the lever is a projecting lug 373 which is adapted to engage a recess 374 in the right-hand face of the follower disc 318 associated with the right-hand face of the smallest diaphragm 298.

When fluid under pressure is supplied to the chamber 398 it acts on the left-hand face of the diaphragm 299 to urge it in the right-hand direction. The levers 353 are accordingly pivoted in a clockwise direction, as viewed in Fig. 2, about the pins 354 and the lower end of the lever 359 is accordingly shifted in the left-hand direction with the upper end of the lever 359 pivoting on the end of the stem 364. Force is accordingly applied, by the lever 359, urging the stack of diaphragms in the left-hand direction, the force being proportional to the force acting on the diaphragm 299.

The spring 369 is of such strength and is so tensioned that the fluid pressure acting on the diaphragm 299 in the chamber 398 is ineffective to cause the stem 364 to be shifted in the right-hand direction until substantially five pounds per square inch of pressure has been built up in the secondary control pipe 77.

The effective area of the diaphragm 299 is so proportioned as to counterbalance the force of the biasing spring 285 acting through the plunger 268 to urge the stack of diaphragms in the right-hand direction and to cause such additional force to be imposed on the stack of diaphragms urging them in the left-hand direction as to cause the same pressure to be built up in the secondary control pipe 77 as exists in the primary control pipe 77a and accordingly in the chamber 398.

When the pressure of the fluid in the primary control pipe 77a and accordingly in the chamber 398 exceeds the value of five pounds per square inch, the force urging the diaphragm 299 in the right-hand direction and the stack of diaphragms in the left-hand direction is sufficient to overcome the tension of the spring 369 to permit shifting of the stem 364 in the right-hand direction and thus to prevent the further increase in the force exerted through the lever 359 and urging the diaphragm in the left-hand direction.

In view of the fact that the supply and the release of fluid under pressure to and from the chambers 395, 396 and 397 between the diaphragms 295, 296, 297 and 298 is effected in exactly the same manner as for the chambers 115, 116 and 117, respectively, of the control valve device 9 by means of magnet valve devices corresponding to the magnet valve devices 125, 126 and 127 which are under the control of a speed-responsive switch device identical with the speed-responsive switch device 10 shown and described in connection with Fig. 1, it is believed unnecessary to describe in detail the general operation of the control valve device 9a. Therefore, only so much of the operation of the control valve device 9a as differs from that explained in connection with control valve device 9 will be described.

Let it be assumed that the car or train is traveling along the tracks at a speed below the certain uniform low speed of fifteen miles per hour and that the self-lapping brake control device 8 has been operated to charge the primary control pipe 77a and accordingly the chamber 398 in the control valve device 9a to a pressure corresponding to the position of the operating handle 47 of the control device 8 in the application zone. As will be remembered from the operation of the control valve device 9 previously described, the chambers 395, 396 and 397 corresponding to the chambers 115, 116 and 117 of the control valve device 9 are vented to atmosphere in such case. Thus, as the pressure of the fluid increases in the chamber 398 at the right-hand face of the small diaphragm 298, the stack of diaphragms 295, 296, 297 and 298 is urged in the left-hand direction by a force which is equal to the force of the pressure acting on the right-hand face of the small diaphragm 298 plus the force of the pressure acting on the left-hand face of the diaphragm 299 and transmitted, through the levers 353 and 359, to the follower 318 on the right-hand face of the small diaphragm 298. The plunger 268 of the relay valve mechanism 241 is accordingly shifted in the left-hand direction against the force of the spring 285 to first seat the release valve 258 and then unseat the supply valve 253. Fluid under pressure is accordingly supplied from the feed valve pipe 71 to the secondary control pipe 77 through the branch pipe 72, chamber 251 past the unseated supply valve 253, through the bore 252 into the bore 247 and thence through a port 381 in the wall of the casing section 61a, an annular passage 382 extending around the piston 269 formed on the plunger 268, a port 383 in the wall of the casing, chamber 263 and pipe and passage 76. The pressures on opposite sides of the piston 269 of the plunger 268 are equalized through a port 385 in the piston, it being apparent that fluid under pressure supplied into the bore 247 flows past the fluted spacer 275, through the slot 249 into bore 246, through the space between the spaced parallel portions 272 of the plunger 268 and through the port 385. In a similar manner, the pressure of fluid acting in chamber 263 on the piston 257 carrying the release valve 258 is equalized or balanced by the pressure of fluid supplied from the bore 246 through the slot 248 to the right-hand side of the piston 257 in the bore 245.

In a manner similar to that in the control valve device 9 of Fig. 1, the pressure of the fluid supplied to the secondary control pipe 77 is effective in the chamber 386 at the left-hand face of the diaphragm follower 244 and thus when the pressure of the fluid acting in the chamber 386 to urge the stack of diaphragms in the right-hand direction sufficiently balances the fluid pressure force urging the stack of diaphragms in the left-hand direction, the spring 285 becomes effective to return the plunger 268 a certain degree in the right-hand direction. As a result, the supply valve 253 is reseated to cut off the further increase in the pressure in the secondary control pipe 77 and in the chamber 386. Further movement of the plunger 268 in the right-hand direction is thus stopped so that the supply valve 253 remains held in seated position.

For pressures in the primary control pipe 77a and in the chamber 398 up to, for example, five pounds per square inch, a substantially equal pressure is attained in the secondary control pipe 77 and accordingly in the brake cylinder 7 since a substantially equal balancing pressure acting on the left-hand face of the diaphragm follower 244 is necessary in order to cause the relay valve mechanism 241 to be conditioned in lap position.

As the pressure in the primary control pipe 77a and thus in the chamber 398 increases above the five pounds per square inch, the force exerted by the lever 359 on the end of the stem 364 overcomes the tension of the spring 369 and the stem 364 is accordingly yieldingly moved in the right-hand direction so that the force applied to the stack of diaphragms urging it in the left-hand direction due to the force of the pressure in the chamber 398 acting on the left-hand face of the diaphragm 299 does not thereafter increase appreciably because further movement of the diaphragm 299 in the right-hand direction to further compress the spring 364 and thus increase the force urging the diaphragm stack in the left-hand direction is prevented by the engagement of the follower 349, associated with the diaphragm 299, with the stop screw 345.

It will be apparent, therefore, that as the pressure in the primary control pipe 77 and in the chamber 398 continues to increase above the five pounds per square inch pressure, the biasing force on the stack of diaphragms caused by the pressure in chamber 398 acting on the left-hand face of the diaphragm 299 is maintained and thus alters to some extent the ratio between the primary control pipe pressure and the secondary control pipe pressure which would ordinarily be in the ratio of the area of the diaphragm 298 to the area of the diaphragm 295. However for very high pressures in the primary control pipe 77a and in the chamber 398 the effect of the biasing force caused by the pressure on the diaphragm 299 is a relatively small percentage. For example, if the area of the diaphragm follower 244 is to the area of the smallest diaphragm 298 in the ration of three to one and if the primary control pipe 77a and the chamber 398 are charged to a pressure of one hundred pounds per square inch, the pressure attained in the secondary control pipe 77 may be of the order of forty pounds per square inch instead of the thirty-three pounds per square inch which would be effected but for the presence of the additional diaphragm 299 and associated lever mechanism.

Since the biasing force exerted on the stack of diaphragms by the pressure of the fluid in chamber 398, on the left-hand face of the diaphragm 299 is designed to compensate for the difference in the areas of the follower 244 of the largest diaphragm 295 and the area of the smallest diaphragm 298, it will be apparent that if an application of the brakes is initiated at a time that the car or train is traveling at a speed higher than the certain uniform low speed of fifteen miles per hour, the biasing force will be greater than that necessary in order to make up for the difference between the area of the follower 244 of diaphragm 295 and the diaphragm 296 or between the follower 244 and the diaphragm 297 and, consequently, that for the lower pressures in the primary control pipe 77a and in the chamber 398 of the control valve device 9a, the pressure in the secondary control pipe 77 may exceed the pressure in the primary control pipe 77a. This is an advantage, if anything, because the brake shoes may be moved into contact with the car wheels for pressures in the primary control pipe 77a which are less than that necessary or required to move the brake shoes into contact with the car wheels.

As the pressure in the primary control pipe 77a increases for the various speed ranges of the speed-responsive switch device 10, the effect of the biasing force on the stack of diaphragms and the ultimate effect on secondary control pipe pressure produced by the pressure of the fluid on the diaphragm 299, decreases in percentage and the ratio of the pressure in the secondary control pipe 77 to the pressure in the primary control pipe 77a gradually approaches that ratio determined by the ratio of the effective area of the diaphragm 297, diaphragm 296, or the diaphragm 295 to the area of the follower 244 of diaphragm 295, depending upon whether the chamber 397 alone, the chambers 397 and 396, or the chambers 397, 396 and 395 are charged with fluid under pressure from the primary control pipe 77a.

As previously explained, the automatic reduction in the secondary control pipe pressure, and thus in the brake cylinder pressure, according to the speed of travel of the car or train is always along a uniform curve for a given primary control pipe pressure. Thus, assuming that the reduction in the secondary control pipe pressure is taking place along a curve corresponding to a given primary control pipe pressure and that the operator shifts the operating handle 47 of the brake control device 8 back toward release position to reduce the pressure in the primary control pipe 77a, the pressure in the chambers 395, 396 and 397 of the control valve device 9a will be higher than that in the chamber 398 which is connected through the passage 111 to the primary control pipe 77a. Consequently the check valves 495, 496 and 497 are unseated by the higher fluid pressure acting on the inner seated area thereof in passages 335, 336 and 337 respectively, depending upon which of the chambers are charged. Thus the pressure, if any, in the chambers 395, 396 and 397 is immediately and rapidly reduced to the pressure in the chamber 398 and in the primary control pipe 77a, whereupon the check valves 495, 496 and 497 are reseated by the biasing spring 494.

Upon the reduction in the pressure in chambers 395, 396 and 397 to correspond to that in the primary control pipe, the relay valve mechanism 241 is operated to release fluid under pressure from the secondary control pipe in the manner similar to that previously described, to proportionately reduce the pressure in the secondary control pipe to a pressure having a ratio to the primary control pipe pressure dependent upon the speed of travel of the car. Thereafter, the reduction of secondary control pipe pressure effected automatically by the control valve device 9a is along a uniform curve for the particular pressure to which the primary control pipe pressure has been reduced.

Obviously the brake control device 8 may be operated any number of times to successively decrease the primary control pipe pressure and each time the pressure in the chambers 395, 396 and 397 or in chambers 396 and 397 or in chamber 397 alone, is proportionately and rapidly reduced to correspondingly reduce the secondary control pipe pressure and brake cylinder pressure.

*Summary*

Summarizing, it will be seen that I have disclosed herein a brake system of the character described in detail in my copending application Serial No. 741,063, and including two embodiments of a control valve device which is automatically controlled according to the speed of travel of the car or train for causing the degree of the application of the brakes, that is the braking ratio, at the time the application is initially effected to be in accordance with the speed of travel of the car or train at the time the application of the brakes is initiated. The degree of the application of the brakes and thus the braking ratio is determined according to the pressure to which a primary control pipe is charged under the control of the operator, the control valve device functioning to proportionately charge a secondary control pipe, which controls the brake cylinder pressure.

It will also be seen that I have provided novel control devices in a brake system of the character described, which function automatically, as the speed of the car or train reduces under the application of the brakes, to reduce the pressure in the secondary control pipe and accordingly in the brake cylinders in a series of steps or graduations, without however necessitating any change, under the control of the operator, in the primary control pipe pressure. Furthermore, by the provision of suitable timing means, reductions in the secondary control pipe pressure and accordingly in the brake cylinder pressure take place gradually and along a uniform curve for a given primary control pipe pressure.

It will, furthermore, be seen that in the type of control valve device, as shown in Figs. 2, 3 and 4, I have provided two features not possessed by the control valve device shown in Fig. 1. One feature comprises the provision of an additional diaphragm to compensate for the difference between the areas of the largest and the smallest of the diaphragms so that up to a certain pressure, such as five pounds per square inch, in the secondary control pipe and accordingly in the brake cylinder, the ratio between the primary control pipe pressure and the secondary control pipe pressure is in a substantially one to one ratio. The purpose of this feature is to move the brake shoes into contact with the car wheels upon the first few pounds of build-up in the primary control pipe pressure. The other feature included in the control valve device shown in Fig. 2 is the provision of check valves for enabling rapid reduction of the pressure in the chambers between successive diaphragms upon a reduction in the primary control pipe pressure, so that the subsequent reduction in the secondary control pipe pressure and accordingly in the brake cylinder pressure may substantially immediately be along a curve corresponding to the reduced primary control pipe pressure.

It should definitely be understood that in practice I contemplate and intend that the brake system in which the control valve devices 9 and 9a are to be employed are of the general character shown in my copending application Serial No. 741,063 and I do not intend therefore that they be restricted in their appliiation to the specific and simplified brake systems shown in Fig. 1. Various omissions, additions or modifications may be made in the embodiments of my invention as shown in the drawings without departing from the spirit of the invention and I do not, therefore, intend to limit the scope of my invention except as it is necessitated by the scope of the prior art.

Having now described my invention, what I claim as new and desire to secure by Letters Patent, is:

1. In a fluid pressure brake system, in combination, means providing a plurality of chambers, means operative to effect charging of all of said chambers with fluid under pressure upon initiating an application of the brakes, speed-controlled means for varying the pressure in said chambers successively, and brake control means operative according to the variation of pressure in said chambers for controlling the degree of application of the brakes.

2. In a fluid pressure brake system, in combination, means providing a plurality of chambers, means operative to effect charging of all of said chambers with fluid under pressure upon initiating an application of the brakes, speed-controlled means for reducing the pressure in said chambers successively, and brake control means operatively responsive to the reduction in the pressure in said chambers successively for correspondingly reducing the degree of the brake application.

3. In a fluid pressure brake system for vehicles, means providing a plurality of chambers, means operative to cause fluid under pressure to be supplied for charging said chambers when initiating an application of the brakes, means controlled according to the speed of the vehicle for selectively determining which chamber or chambers are charged initially upon operation of said last means, and for thereafter reducing the pressure in the charged chambers successively as the speed of the vehicle reduces, and means operative according to which chamber or chambers are charged and according to the reduction in the pressure in the charged chambers for effecting corresponding different degrees of application of the brakes.

4. In a fluid pressure brake system for vehicles, means providing a plurality of chambers, means operative to cause fluid under pressure to be supplied for charging said chambers when initiating an application of the brakes, means controlled according to the speed of the vehicle for selectively determining which chamber or chambers are charged initially upon operation of said last means, and for thereafter reducing the pressure in the charged chambers successively as the speed of the vehicle reduces, means operative according to which chamber or chambers are charged and according to the reduction in the pressure in the charged chambers for effecting corresponding different degrees of application of the brakes, and means for timing the rate of reduction in said chambers as and when effected by the speed-controlled means for causing the variation from one degree of application of the brakes to a lower degree to occur gradually.

5. In a fluid pressure brake system for vehicles, means providing a plurality of chambers, means operative to cause fluid under pressure to be supplied for charging said chambers when initiating an application of the brakes, means controlled according to the speed of the vehicle for selectively determining which chamber or chambers are charged initially upon operation of said last means, and for thereafter reducing the pressure in the charged chambers successively as the speed of the vehicle reduces, means operative according to which chamber or chambers are charged and according to the reduction in the pressure in the charged chambers for effecting corresponding different degrees of application of the brakes, and means including a separate chamber connected to each of said plurality of chambers, respectively, and a separate choke for each of said plurality of chambers and its connected chamber through which fluid under pressure is vented therefrom, for timing the rate of reduction in said chambers as and when effected by the speed-controlled means for causing the variation from one degree of application of the brakes to a lower degree to occur gradually.

6. In a fluid pressure brake system for vehicles, in combination, a control pipe chargeable with fluid under pressure to initiate application of the brakes, valve means operative to control the supply and release of fluid under pressure whereby the degree of the application of the brakes is controlled, a plurality of connected movable abutments, of different areas respectively, disposed in spaced coaxial relation, for effecting operation of said valve means, means controlled according to the speed of the vehicle for causing one or more of the spaces between successive abutments to be charged with fluid under pressure from the said control pipe and for thereafter reducing the pressure in the charged spaces in succession as the speed of the vehicle reduces, said valve means being operated in accordance with the force of the control pipe pressure acting on the abutments to cause corresponding different degrees of application of the brakes to be effected.

7. In a fluid pressure brake system for vehicles, in combination, a brake cylinder, a control pipe chargeable with fluid under pressure to initiate the application of the brakes, means controlled according to the pressure in the control pipe and according to the speed of the vehicle and operative to cause the initial establishment in the brake cylinder of a pressure having a certain uniform ratio to the control pipe pressure and operative thereafter, as the speed of the vehicle reduces, to cause reduction of the brake cylinder pressure in a plurality of steps without any reduction in the control pipe pressure, and means effective for each step of reduction for controlling the rate of reduction in brake cylinder pressure independently of the speed of the vehicle.

8. In a fluid pressure brake system for vehicles, in combination, a brake cylinder, a control pipe chargeable with fluid under pressure to initiate the application of the brakes, valve means operative to control the pressure in the brake cylinder, a differential fluid pressure responsive means subject in opposing relation to the pressure in the control pipe and a pressure corresponding to that in the brake cylinder for operating said valve means, and means controlled according to the speed of the vehicle for so controlling the area of the fluid pressure responsive means subject to the effective force of the control pipe pressure as to cause operation of the valve means to establish an initial pressure in the brake cylinder having a certain uniform ratio to the pressure in the control pipe and thereafter, as the speed of the vehicle reduces, to establish a succession of different pressures in the brake cylinder, each pressure in the succession having a certain uniform ratio to the pressure in the control pipe lower than the ratio of the immediately preceding pressure.

9. In a fluid pressure brake system for a vehicle, the combination of a primary control pipe chargeable with fluid under pressure to initiate application of the brakes, a secondary control pipe effective to control the degree of application of the brakes according to the pressure to which it is charged, a valve mechanism controlled according to the pressure in the primary control pipe and according to the speed of travel of the vehicle for causing the secondary control pipe to be charged initially to a pressure having a certain uniform ratio to the pressure established in the primary control pipe and for thereafter effecting the reduction of the secondary control pipe pressure in a plurality of steps without any reduction in the primary control pipe pressure as the speed of the vehicle reduces due to the application of the brakes, and timing means for controlling the rate of the reduction in the secondary control pipe pressure for each step independently of vehicle speed.

10. In a fluid pressure brake system for a vehicle, the combination of a primary control pipe chargeable with fluid under pressure to initiate application of the brakes, a secondary control pipe effective to control the degree of application of the brakes according to the pressure to which it is charged, and a valve mechanism controlled according to the pressure in the primary control pipe and according to the speed of travel of the vehicle for causing the secondary control pipe to be charged initially to any one of a plurality of pressures having uniform different ratios to the pressure established in the primary control pipe, the particular pressure ratio initially effective being dependent upon the speed of travel of the vehicle being within a corresponding one of a plurality of speed zones at the time the application of the brakes is initiated, said valve mechanism being operative thereafter as the speed of the vehicle reduces and comes within other and lower speed zones for reducing the pressure in the secondary control pipe to others of the plurality of pressures having successively lower uniform ratios to the primary control pipe pressure.

11. In a fluid pressure brake system for vehicles, the combination of a primary control pipe chargeable with fluid under pressure to initiate application of the brakes, a secondary control pipe effective to control the degree of application of the brakes in accordance with the degree of fluid pressure established in the secondary control pipe, valve mechanism for controlling the supply and release of fluid under pressure to and from said secondary control pipe, and a differential fluid pressure operated means controlled according to the speed of the vehicle and according to the pressure in the primary control pipe, for operating said valve mechanism, upon an application of the brakes being initiated, to initially establish a pressure in the secondary control pipe which bears any one of a plurality of different uniform ratios to the primary control pipe pressure, the particular ratio effected being determined according to the speed of the vehicle at the time the application of the brakes is initiated being within a corresponding one of a plurality of speed zones, said differential fluid pressure operated means being effective to operate the valve mechanism, as the vehicle decelerates successively through the other and lower speed zones, to reduce the pressure in the secondary control pipe to a ratio with the primary control pipe corresponding to the zone of speed in which the vehicle is traveling.

12. In a fluid pressure brake system for vehicles, the combination of a primary control pipe chargeable with fluid under pressure to initiate application of the brakes, a secondary control pipe effective to control the degree of application of the brakes in accordance with the degree of fluid pressure established in the secondary control pipe, valve mechanism for controlling the supply and release of fluid under pressure to and from said secondary control pipe, a differential fluid pressure operated means for operating the valve mechanism, comprising a plurality of abutments of different areas, respectively, and arranged in spaced coaxial relation with the abutments decreasing successively in area, and means controlled according to the speed of the vehicle and effective upon the initiation of an application of the brakes for selectively subjecting different ones of said abutments to the unbalanced pressure of the primary control pipe pressure to vary the force urging the valve mechanism in a direction to supply fluid under pressure to the secondary control pipe, the outer face of the largest abutment being subject to the pressure of the secondary control pipe acting to oppose the force of the primary control pipe pressure on the abutments, the pressure established in the secondary control pipe by the valve mechanism being in substantially the same ratio to the pressure in the primary control pipe as the area of the abutment subject to the unbalanced primary control pipe pressure is to the area of the largest abutment.

13. In a fluid pressure brake system for vehicles, the combination of a primary control pipe chargeable with fluid under pressure to initiate application of the brakes, a secondary control pipe effective to control the degree of application of the brakes in accordance with the degree of fluid pressure established in the secondary control pipe, valve mechanism for controlling the supply and release of fluid under pressure to and from said secondary control pipe, a differential fluid pressure operated means for operating the valve mechanism, comprising a plurality of abutments of different areas, respectively, and arranged in spaced coaxial relation with the abutments decreasing successively in area, means controlled according to the speed of the vehicle and effective upon the initiation of an application of the brakes for selectively subjecting different ones of said abutments to the unbalanced pressure of the primary control pipe pressure to vary the force urging the valve mechanism in a direction to supply fluid under pressure to the secondary control pipe, the outer face of the largest abutment being subject to the pressure of the secondary control pipe acting to oppose the force of the primary control pipe pressure on the abutments, the pressure established in the secondary control pipe by the valve mechanism being in substantialy the same ratio to the pressure in the primary control pipe as the area of the abutment subject to the unbalanced primary control pipe pressure is to the area of the largest abutment, and means for restricting the rate of reduction of primary control pipe pressure on said abutments in changing the unbalanced primary control pipe pressure from one abutment to another for causing a gradual reduction in secondary control pipe pressure in reducing from a higher pressure ratio with the primary control pipe pressure to a lower pressure ratio with the primary control pipe pressure.

14. In a fluid pressure brake system for vehicles, in combination, a first control pipe chargeable with fluid under pressure, a second control pipe effective to control the degree of brake application according to the fluid pressure in the second control pipe, means controlled according to the speed of the vehicle for varying the ratio of the fluid pressure in the second control pipe to the fluid pressure in the first control pipe, and pressure responsive means effective as long as the pressure in the first control pipe does not exceed a certain predetermined low pressure, for preventing said last means from causing the pressure in the second control pipe to vary from a substantially one-to-one ratio with respect to the pressure in the first control pipe.

15. In a fluid pressure brake system for vehicles, in combination, a brake cylinder, a control pipe chargeable with fluid under pressure, means controlled according to the speed of the vehicle for controlling the ratio of pressure in the brake cylinder to the pressure in said control pipe, and pressure responsive means effective as long as the pressure in the control pipe does not exceed a certain predetermined low pressure for preventing said last means from causing the brake cylinder pressure to vary from a substantially one-to-one ratio with respect to the pressure in the control pipe.

16. In a fluid pressure brake system for vehicles, in combination, a brake cylinder, a control pipe chargeable with fluid under pressure, means controlled according to the pressure in the control pipe and according to the speed of the vehicle for first causing a certain pressure to be established in the brake cylinder and then, as the speed of the vehicle reduces during an application of the brakes, causing reduction in the brake cylinder pressure to a pressure below the pressure in the control pipe, and pressure responsive means effective as long as the pressure in the control pipe is not in excess of a certain predetermined low pressure, for preventing said last means from causing the brake cylinder pressure to be less than the pressure in the control pipe.

17. In a fluid pressure brake system for vehicles, in combination, a first control pipe chargeable with fluid under pressure, a second control pipe effective to control the degree of brake application according to the fluid pressure in the second control pipe, valve means operative to control the pressure of fluid in the second control pipe, fluid pressure responsive means controlled according to the pressure in the first control pipe and according to the speed of the vehicle for so operating said valve means as to cause it to produce a pressure in the second control pipe which is less than the pressure in the first control pipe, and a second fluid pressure responsive means subject to the pressure in the first control pipe and effective as long as the pressure in the first control pipe is not in excess of a certain uniform low pressure for so modifying the operation of the valve means as to cause it to establish a pressure in the second control pipe at least equal to the pressure in the first control pipe.

18. In a fluid pressure brake system for vehicles, in combination, a first control pipe chargeable with fluid under pressure, a second control pipe effective to control the degree of brake application according to the fluid pressure in the second control pipe, valve means operative to control the pressure of fluid in the second control pipe, fluid pressure responsive means differentially subject in opposing relation to the pressure in said first control pipe and in said second control pipe, for effecting operation of said valve means to produce a pressure in the second control pipe less than that in the first control pipe, a second fluid pressure responsive means subject to the pressure in the first control pipe for imposing a biasing force on the first said fluid pressure responsive means so as to cause operation of the valve means to produce a pressure in the second control pipe at least equal to the pressure in the first control pipe, and means rendering said second fluid pressure responsive means ineffective to further increase the biasing force when the pressure in the first control pipe is higher than a certain low pressure.

19. In a fluid pressure brake system for vehicles, in combination, a control pipe, a plurality of movable abutments, of different areas respectively, disposed in spaced coaxial relation, each pair of successive abutments having a chamber therebetween, valve means operated by said abutments responsively to variations in the pressure in said chambers for controlling the degree of application of the brakes, means controlled according to the speed of the vehicle for supplying fluid under pressure from the control pipe to said chambers and for releasing fluid under pressure from said chambers, and means for reducing the pressure in said chambers in accordance with a reduction in the pressure in the control pipe, independently of the speed-controlled means.

20. In a fluid pressure brake system for vehicles, in combination, a control pipe, a plurality of movable abutments, of different areas respectively, disposed in spaced coaxial relation, each pair of successive abutments having a chamber therebetween, valve means operated by said abutments responsively to variations in the pressure in said chambers for controlling the degree of application of the brakes, means controlled according to the speed of the vehicle for supplying fluid under pressure from the control pipe to said chambers at a certain rate, and for releasing fluid under pressure from said chambers at a relatively slow rate, and means effective upon a reduction in control pipe pressure below the pressure in the chambers for effecting a corresponding reduction in chamber pressure at a relatively rapid rate.

21. In a fluid pressure brake system for vehicles, in combination, a control pipe, a plurality of movable abutments, of different areas respectively, disposed in spaced coaxial relation, each pair of successive abutments having a chamber therebetween, valve means operated by said abutments responsively to variations in the pressure in said chambers for controlling the degree of application of the brakes, means controlled according to the speed of the vehicle for supplying fluid under pressure from the control pipe to said chambers and for releasing fluid under pressure from said chambers, and a one-way check valve for each chamber, each check valve being interposed between the corresponding chamber and the control pipe for effecting equalization of chamber pressure with control pipe pressure only when the control pipe pressure is reduced below chamber pressure.

22. A control valve device comprising a casing, a plurality of unconnected cooperating movable abutments of different areas contained in the casing and disposed in spaced coaxial relation, spacing means carried on one face of each abutment for establishing a minimum space between successive abutments, means for controlling the supply and release of fluid under pressure to and from the space between successive abutments, pressure control means operated according to the unbalance of fluid pressure forces acting on the abutments, and an additional abutment contained in said casing and subject to the pressure of fluid supplied to the spaces between said plurality of abutments, said additional abutment being effective, up to a certain low uniform pressure to impose a force proportional to the pressure acting thereon on the said plurality of abutments which force acts in the same direction as the unbalanced fluid pressure forces acting on said plurality of abutments to modify the operation of said pressure control means.

23. A control valve device comprising a casing, a plurality of unconnected cooperating movable abutments of different areas contained in the casing and disposed in spaced coaxial relation, spacing means carried on one face of each abutment for establishing a minimum space between successive abutments, means for controlling the supply and release of fluid under pressure to and from the space between successive abutments, pressure control means operated according to the unbalance of fluid pressure forces acting on the abutments, an additional abutment contained in said casing and subject on one side to the pressure of fluid supplied to the spaces between said plurality of abutments, a pivot support, a spring yieldingly holding the pivot support against movement, a lever pivoted on said pivot support and pivotally moved thereon by the force of the fluid pressure acting on the said additional abutment to apply a force to the said plurality of abutments, acting in the same direction as the unbalanced fluid pressure forces acting on the abutments, to modify the operation of the pressure control means, said spring yielding to permit movement of the pivot support and thereby to limit the force applied to the plurality of abutments when the pressure acting on the said additional abutment exceeds a certain uniform low pressure.

24. In a fluid pressure brake system for vehicles, in combination, a brake cylinder, a control pipe chargeable with fluid under pressure to initiate the application of the brakes, brake control means conditionable differently at different times and operative in response to a uniform control pipe pressure at the different times, respectively, for causing the establishment of brake cylinder pressures bearing different uniform ratios to the control pipe pressure, and means controlled according to the speed of the vehicle for conditioning said brake control means differently for each of a plurality of successive speed ranges to cause said brake control means to cause the initial establishment of a brake cylinder pressure having a certain uniform ratio to the control pipe pressure corresponding to the particular range of speed within which the vehicle is traveling at the time the application of the brakes is initiated, and also to cause said brake control means to reduce the brake cylinder pressure to a plurality of successively lower uniform ratios to the control pipe pressure as the speed of vehicle successively enters the corresponding speed ranges.

25. In a vehicle brake system, in combination, valve means operative to control the degree of application and the release of the brakes, a plurality of movable abutments, said abutments being so arranged that one of said abutments is effective when subject on one side to fluid at a certain pressure for effecting operation of said valve means to effect a certain degree of application of the brakes, and another of said abutments is effective when subject on one side to fluid at said certain pressure while said one abutment is not subject on the said one side thereof to fluid under pressure, for effecting operation of said valve means to effect a degree of application different from said certain degree, and means for selectively controlling the supply of fluid under pressure to said abutments.

26. In a vehicle brake system, in combination, valve means operative to control the degree of application and the release of the brakes, a plurality of movable abutments of different effective pressure areas for operating said valve means, said abutments being so arranged as to be effective, respectively, when subject individually on one side to the same degree of fluid pressure, to operate said valve means to effect an application of the brakes the degree of which corresponds to the effective area of the abutment subject to the pressure, and means for selectively controlling the supply of fluid under pressure to said abutments.

27. In a vehicle brake system, in combination, a brake cylinder, valve means operative to control the pressure of fluid in the brake cylinder for controlling application and release of the brakes, two unconnected movable abutments of different effective pressure areas, respectively, disposed in spaced coaxial relation, and means cooperating with the abutments to form a chamber between the abutments, one of said abutments being movable independently of the other abutment in response to a certain pressure of fluid supplied to said chamber, for causing operation of the valve means to produce a certain brake cylinder pressure, and both of said abutments being movable together in response to said certain pressure of fluid acting on the outer face of the said other abutment, for causing the operation of the valve means to produce a brake cylinder pressure different from said certain pressure.

28. In a vehicle brake system, in combination, a brake cylinder, valve means operative to control the pressure of fluid in the brake cylinder for controlling application and release of the brakes, two unconnected movable abutments of different effective pressure areas respectively, and means cooperating with the abutments to form a chamber between the abutments, one of said abutments being movable independently of the other abutment in response to a certain fluid pressure acting in said chamber, for causing operation of the valve means to produce a certain brake cylinder pressure, and both of said abutments being movable together in response to said certain fluid pressure exerted on the outer face of the said other abutment, for causing operation of the valve means to produce a brake cylinder pressure which differs from the said certain brake cylinder pressure in the same proportion as the ratio of the effective area of said other abutment to the effective area of said one abutment.

29. In a vehicle brake system, in combination, a supply valve for controlling a communication through which fluid under pressure is supplied to effect an application of the brakes, a release valve for controlling a communication through which fluid under pressure is released to effect a release of the brakes, valve operating means including a lever mechanism for operating said two valves, a plurality of unconnected movable abutments, means cooperating with said movable abutments to form a plurality of pressure chambers associated with said abutments, each of said abutments being responsive to fluid pressure in a corresponding one of said chambers for actuating said valve operating means, and means for selectively controlling the supply of fluid under pressure to said chambers.

30. In a vehicle brake system, in combination, a supply valve for controlling a communication through which fluid under pressure is supplied to effect an application of the brakes, a release valve for controlling a communication through which fluid under pressure is released to effect a release of the brakes, means for operating said valves including a plurality of unconnected movable abutments, means cooperating with said movable abutments to form a plurality of pressure chambers associated with said abutments, each of said abutments being effective individually to control the operation of said supply and release valves in response to the pressure of fluid supplied to different chambers associated respectively therewith, and means controlled according to a variable operating condition of the vehicle for selectively controlling the supply of fluid under pressure to said chambers.

31. In a vehicle brake system, in combination, a brake cylinder, a supply valve for controlling a communication through which fluid under pressure is supplied to the brake cylinder, a release valve for controlling a communication through which fluid under pressure is released from the brake cylinder, a mechanism including a lever for operating said two valves, a plurality of unconnected movable diaphragms arranged in spaced coaxial relation, said diaphragms being of different effective pressure areas, means cooperating with said diaphragms to form a plurality of pressure chambers, said diaphragms being movably responsive, respectively, to fluid pressures in said chambers for actuating said mechanism, and means for selectively controlling the supply of fluid under pressure to the said chambers.

32. A vehicle brake system comprising in combination, a brake cylinder, a control pipe chargeable with fluid under pressure to initiate the application of the brakes, valve means operative to control the pressure in the brake cylinder, fluid pressure responsive means subject in opposing relation to the pressure in the control pipe and a pressure corresponding to that in the brake cylinder for operating said valve means, and means controlled according to the speed of the vehicle for causing the fluid pressure responsive means to be subject over a certain area thereof to the effective force of the pressure in the control pipe upon the initiation of an application of the brakes, and as the speed of the vehicle reduces, to cause the fluid pressure responsive means to be subject only over an area less than said certain area to the effective force of the control pipe pressure and thereby effect operation of the valve means to correspondingly reduce the pressure in the brake cylinder without reduction of the pressure in the control pipe.

33. In a vehicle or train brake system, in combination, means variously conditionable to establish different degrees of braking force for effecting application of the brakes, a first electroresponsive means, a second electroresponsive means, said two electroresponsive means being jointly effective when both are energized for conditioning the brake control means to establish a certain degree of braking force, effective jointly when the first electroresponsive means is deenergized and the second electroresponsive means is energized for conditioning the said brake control means to establish a second certain degree of braking force less than the said first degree, and effective jointly when both electroresponsive means are deenergized for conditioning the said brake control means to establish a third certain degree of braking force less than the said second certain degree of braking force, and means for controlling energization and deenergization of the said electroresponsive means.

34. In a vehicle or train brake system, in combination, means variously conditionable to establish different degrees of braking force for effecting application of the brakes, a first electroresponsive means, a second electroresponsive means, said two electroresponsive means being jointly effective when the first electroresponsive means is energized and the second electroresponsive means is deenergized for conditioning the brake control means to establish a certain degree of braking force, effective jointly when both are deenergized to condition the brake control means to establish a second certain degree of braking force less than the first said certain degree of braking force, and effective when the first electroresponsive means is deenergized and the said second electroresponsive means is energized for conditioning the brake control means to establish a third certain degree of braking force less than the said second certain degree of braking force, and means for controlling the energization and deenergization of the said two electroresponsive means to effect reduction of the braking force in the above named sequence.

35. In a vehicle or train brake system, in combination, means variously conditionable to establish different degrees of braking force for effecting application of the brakes, a first, a second, and a third electroresponsive means, said three electroresponsive means being effective when said first and second electroresponsive means are energized and the third electroresponsive means is deenergized to condition the brake control means to establish a certain degree of braking force, effective when the said second electroresponsive means is energized and the said first and third electroresponsive means are deenergized to condition the brake control means to establish a second certain degree of braking force less than the first said certain degree of braking force, effective when all of the electroresponsive means are deenergized to condition the brake control means to establish a third certain degree of braking force less than the said second certain degree of braking force, and effective when said first and said second electroresponsive means are deenergized and the said third electroresponsive means is energized to condition the brake control means to establish a fourth certain degree of braking force less than the said third certain degree of braking force, and means for controlling energization and deenergization of the said three electroresponsive means.

36. In a vehicle or train brake system, in combination, means variously conditionable to establish different degrees of braking force for effecting application of the brakes, a first, a second, and a third electroresponsive means, said three electroresponsive means being effective when said first and second electroresponsive means are energized and the third electroresponsive means is deenergized to condition the brake control means to establish a certain degree of braking force, effective when the said second electroresponsive means is energized and the said first and third electroresponsive means are deenergized to condition the brake control means to establish a second certain degree of braking force less than the first said certain degree of braking force, effective when all of the electroresponsive means are deenergized to condition the brake control means to establish a third certain degree of braking force less than the said second certain degree of braking force, and effective when said first and said second electroresponsive means are deenergized and the said third electroresponsive means is energized to condition the brake control means to establish a fourth certain degree of braking force less than the said third certain degree of braking force, and means for controlling energization and deenergization of the said three electroresponsive means to effect reduction of the braking force in the above named sequence.

37. A control valve device comprising a casing having a chamber, valve means operative to control the supply and release of fluid under pressure to and from said chamber to control the pressure therein, a plurality of unconnected cooperating movable abutments of different areas, arranged in spaced coaxial relation so as to move either individually or collectively, for operating said valve means to vary the pressure in said chamber according to the total unbalance of fluid pressure forces acting on said abutments, and means for selectively supplying fluid under pressure to one or simultaneously to more than one of the spaces between successive pairs of abutments to vary the balance and unbalance of fluid pressure forces on the individual abutments.

38. In a vehicle brake system, in combination, means providing a chamber the fluid pressure in which controls the degree of application of the brakes, valve means controlling the supply and release of fluid under pressure to and from said chamber for controlling the pressure therein, a pair of cooperative unconnected movable abutments disposed in spaced coaxial relation for effecting operation of said valve means, one of said abutments being effective in response to fluid at a certain pressure supplied to the space between said abutments to operate the valve means to establish a certain corresponding pressure in said chamber and the other of said abutments being effective in response to fluid at the said certain pressure supplied to the outer face thereof for effecting operation of said valve means to establish a different corresponding pressure in the said chamber, and means actuated in response to a variable operating condition of the vehicle for controlling the fluid pressure in the space between said abutments.

39. A control valve device comprising a casing having a chamber, valve means for controlling the pressure in said chamber, two cooperating movable abutments of different areas disposed in spaced coaxial relation, one of said abutments being subject to the pressure of fluid in said chamber to effect operation of the valve means to release fluid under pressure from said chamber and the other of said abutments being subject to the pressure of fluid supplied to a second chamber for operating the valve means to effect an increase in pressure in the first said chamber, said abutments being effective to operate the valve means to establish a pressure in the first said chamber which is in ratio to the pressure established in said second chamber according to the ratio of the areas of said abutments, and a third movable abutment subject to the pressure in said second chamber for modifying the operation of the said valve means to establish a pressure in the first said chamber substantially equal to the pressure established in the said second chamber as long as the pressure established in the said second chamber does not exceed a certain uniform pressure.

40. A control device comprising a casing having a chamber, valve means operative to establish different fluid pressures in said chamber, and a plurality of movable abutments for effecting operation of said valve means, said abutments being of different effective pressure areas respectively and arranged in spaced coaxial relation in successive order according to the increase or decrease in area thereof, fluid under pressure being suppliable to one or more of the spaces between successive abutments to cause operation of the valve means to supply fluid under pressure to the said chamber, the largest of said abutments being subject on its outer side to the opposing force of fluid pressure established in said chamber whereby to cause operation of the valve means to lap the supply of fluid under pressure to the said chamber, the pressure established in the said chamber being different when the force of fluid at a given pressure is effective in the spaces between the abutments on different ones of said abutments.

41. A control device comprising a casing having a chamber, valve means operative to establish different fluid pressures in said chamber, and a plurality of unconnected movable abutments for effecting operation of said valve means, said abutments being of different effective pressure areas respectively and arranged in spaced coaxial relation in successive order according to the increase or decrease in area thereof, one or more of said abutments being urged in a direction to effect operation of the valve means to increase the pressure in said chamber depending upon which of the spaces between the abutments are charged with fluid under pressure, the largest of the abutments being subject on its outer side to the opposing force of fluid pressure established in said chamber acting to effect operation of the valve means to cut off the increase of pressure in the said chamber, the pressure established in said chamber varying according to the total force exerted on said abutments by the fluid under pressure in the spaces between the abutments.

42. In combination, a plurality of cooperating unconnected movable abutments of different areas so arranged in spaced coaxial relation as to move individually and collectively, means for causing fluid under pressure to be supplied simultaneously to all of the spaces between the successive pairs of abutments or to a varying number less than all of the spaces whereby to vary the total fluid pressure force acting to displace the abutments out of a normal position thereof, and valve means operatively controlled by movement of said abutments.

ELLIS E. HEWITT.